US008649819B2

(12) United States Patent
Tonogai et al.

(10) Patent No.: US 8,649,819 B2
(45) Date of Patent: Feb. 11, 2014

(54) MOBILE PHONE INTEGRATION WITH A PRIVATE BRANCH EXCHANGE IN A DISTRIBUTED TELEPHONY SYSTEM

(75) Inventors: Dale C. Tonogai, Los Altos, CA (US); Edwin J. Basart, Los Altos, CA (US)

(73) Assignee: ShoreTel, Inc., Sunnyvale, CA (US)

( * ) Notice: Subject to any disclaimer, the term of this patent is extended or adjusted under 35 U.S.C. 154(b) by 127 days.

(21) Appl. No.: 12/778,648

(22) Filed: May 12, 2010

(65) Prior Publication Data

US 2011/0281580 A1 Nov. 17, 2011

(51) Int. Cl.
*H04M 1/00* (2006.01)

(52) U.S. Cl.
USPC .......................................... 455/555

(58) Field of Classification Search
USPC ............................... 455/554.1–555
See application file for complete search history.

(56) References Cited

U.S. PATENT DOCUMENTS

| 7,664,495 | B1 | 2/2010 | Bonner | |
|---|---|---|---|---|
| 2002/0132638 | A1* | 9/2002 | Plahte et al. | 455/555 |
| 2003/0100300 | A1* | 5/2003 | Yang et al. | 455/426 |
| 2004/0087307 | A1 | 5/2004 | Ibe et al. | |
| 2004/0125937 | A1 | 7/2004 | Turcan et al. | |
| 2005/0048967 | A1* | 3/2005 | Hoglander et al. | 455/426.1 |
| 2005/0148362 | A1* | 7/2005 | Jagadeesan et al. | 455/555 |
| 2006/0251113 | A1 | 11/2006 | Jagadeesan et al. | |
| 2007/0206563 | A1 | 9/2007 | Silver et al. | |
| 2007/0206568 | A1 | 9/2007 | Silver et al. | |
| 2007/0206569 | A1 | 9/2007 | Silver et al. | |
| 2007/0206571 | A1 | 9/2007 | Silver et al. | |
| 2007/0206572 | A1 | 9/2007 | Silver et al. | |
| 2007/0206573 | A1 | 9/2007 | Silver et al. | |
| 2007/0206580 | A1 | 9/2007 | Silver et al. | |
| 2007/0206613 | A1 | 9/2007 | Silver et al. | |
| 2007/0206735 | A1 | 9/2007 | Silver et al. | |
| 2008/0102810 | A1 | 5/2008 | Lewis et al. | |
| 2008/0287148 | A1 | 11/2008 | Silver et al. | |
| 2008/0293394 | A1 | 11/2008 | Silver et al. | |
| 2009/0046845 | A1 | 2/2009 | Lewis et al. | |
| 2009/0052399 | A1 | 2/2009 | Silver et al. | |
| 2009/0131060 | A1 | 5/2009 | Silver | |
| 2009/0262733 | A1 | 10/2009 | Olson | |
| 2010/0009674 | A1 | 1/2010 | Sapkota | |

(Continued)

FOREIGN PATENT DOCUMENTS

| EP | 1989893 | 9/2007 |
|---|---|---|
| EP | 1994772 | 9/2007 |

(Continued)

OTHER PUBLICATIONS

International Search Report, PCT/2011/028564, May 5, 2011, 11 pages.

*Primary Examiner* — Temica M Beamer
*Assistant Examiner* — Joel Ajayi
(74) *Attorney, Agent, or Firm* — Patent Law Works LLP

(57) ABSTRACT

A system and method for providing PBX functionality to a mobile phone includes a private branch exchange having a mobile phone proxy. A call control path is established between the mobile phone and a private branch exchange. The call control path is a direct trunk line, a mobile voice network, an IP data network, a mobile data network or a 4G network. The private branch exchange receives a request to perform the PBX function. The private branch exchange uses the call control path to perform the PBX function.

30 Claims, 23 Drawing Sheets

(56) References Cited

U.S. PATENT DOCUMENTS

| | | |
|---|---|---|
| 2010/0048180 A1 | 2/2010 | Sapkota |
| 2010/0111279 A1 | 5/2010 | Gisby et al. |
| 2011/0271289 A1* | 11/2011 | Weiser et al. ............... 719/317 |

FOREIGN PATENT DOCUMENTS

| | | |
|---|---|---|
| WO | WO2007103121 | 9/2007 |
| WO | WO2007103125 | 9/2007 |
| WO | WO2007103127 | 9/2007 |
| WO | WO2007103129 | 9/2007 |
| WO | WO2007103140 | 9/2007 |
| WO | WO2007103217 | 9/2007 |
| WO | WO2007103218 | 9/2007 |
| WO | WO2007103238 | 9/2007 |
| WO | WO2007103269 | 9/2007 |
| WO | WO2008052157 | 5/2008 |
| WO | WO2008144429 | 11/2008 |
| WO | WO2008144702 | 11/2008 |
| WO | WO2009026181 | 2/2009 |
| WO | WO2009026447 | 2/2009 |

* cited by examiner

MOBILE PHONE INTEGRATION WITH A PRIVATE BRANCH EXCHANGE IN A DISTRIBUTED TELEPHONY SYSTEM

BACKGROUND OF THE INVENTION

1. Field of the Invention

The present invention relates to telephony such as that using Voice over Internet Protocol (VoIP). In particular, the present invention relates to integrating Private Branch Exchange (PBX) functionality for a mobile phone in distributed systems using VoIP.

2. Description of the Background Art

A PBX is a telephone exchange that has historically served a particular business office, as opposed to one that a common carrier or telephone company operates for many businesses or the general public. The PBX makes phone call connections among the internal phones of the business and connects them to the public switched telephone network. Each phone in the PBX generally has its own PBX extension number. Generally, this is a four digit number specific to the particular phone. For example, a first phone in the PBX has a phone number "555-555-0001." The extension for the first phone is the last four digits of this number, "0001." If a user of a second phone within the PBX wishes to contact extension 0001 then that user merely has to dial "0001" on a keypad of the second phone instead for the full 10 digits. The PBX then connects the call between the first phone and the second phone using internal resources rather than the Public Switched Telephone Network ("PSTN"), avoiding service charges. In contrast, a phone outside the PBX must call 555-555-0001 to connect a call with the first phone.

Another benefit of PBX systems is that they provide the phones connected to the PBX system with the ability to use various enhanced PBX features or functionality such as, but not limited to: (1) call conferencing; (2) placing calls on hold; (3) call parking; (4) call camping; (5) call transferring; (6) call blocking; and (7) music on hold.

In recent years, PBXs have begun to utilize VoIP technology. These PBX systems use the Internet Protocol to carry calls, and typically cost less money due to cheaper hardware, operating costs and maintenance costs. Accordingly, many business have begun using PBX systems utilizing VoIP technology Another recent trend in business communications is the widespread use of mobile phones. In many businesses, almost all higher-level employees are expected to have a mobile phone. These employees are expected to be available to use their mobile phones up to twenty-four hours a day. Thus, mobile phones are important to business communications. However, a problem with existing PBX systems is that they are unable to integrate mobile phones into the PBX system. As a result, existing mobile phones do not have PBX extensions and cannot utilize PBX functionality.

The prior art has attempted to provide PBX functionality for mobile phones; however, these attempts have been largely unsuccessful and not widely adopted. For example, the prior art has attempted to provide client software that can provide PBX functionality and be loaded onto a mobile phone. One example architecture of the prior art and its disadvantages will be described below with reference to FIG. 1A. This prior art solution suffers from a number of problems. First, it is not available for all mobile phones, and will only work on smart phones. Second, it requires that the user download and activate client software to operate it on the mobile phone. This is cumbersome and difficult for users to accomplish. Third, it is difficult to provide such client software and it is not available for all of phones because there are thousands of different types of mobile phones, with more appearing monthly, each of which needs its own specific client software adapted to its operating system and/or specific functionality provided by that particular mobile phone. Fourth, most mobile networks and mobile phones cannot transmit voice and data simultaneously. As a result, a client application on the mobile phone cannot signal a PBX via the data network when there is an active phone call simultaneously ongoing. Fifth, on some mobile phones, the client application cannot be run when there is an active phone call simultaneously ongoing.

For these reasons, the prior art has not been successful in providing PBX functionality for mobile phones.

SUMMARY OF THE INVENTION

A system and method for providing PBX functionality to mobile phones is described below. A call control path is established between a mobile phone and a private branch exchange. The call control path is a direct trunk line, an IP data network, a mobile data network, a mobile voice network, a 4G network, a combination of the preceding, or any other connection between the mobile phone and the private branch exchange. The private branch exchange receives a request to perform a PBX function. The private branch exchange uses the call control path between the private branch exchange and the mobile phone to perform the PBX function in conjunction with the mobile phone and the PBX.

The present invention also includes a variety of methods including a method for performing a PBX function using a call control path established between the private branch exchange and the mobile phone.

BRIEF DESCRIPTION OF THE DRAWINGS

The invention is illustrated by way of example, and not by way of limitation in the figures of the accompanying drawings in which like reference numerals are used to refer to similar elements.

DETAILED DESCRIPTION OF THE PREFERRED EMBODIMENTS

Figure 1A:
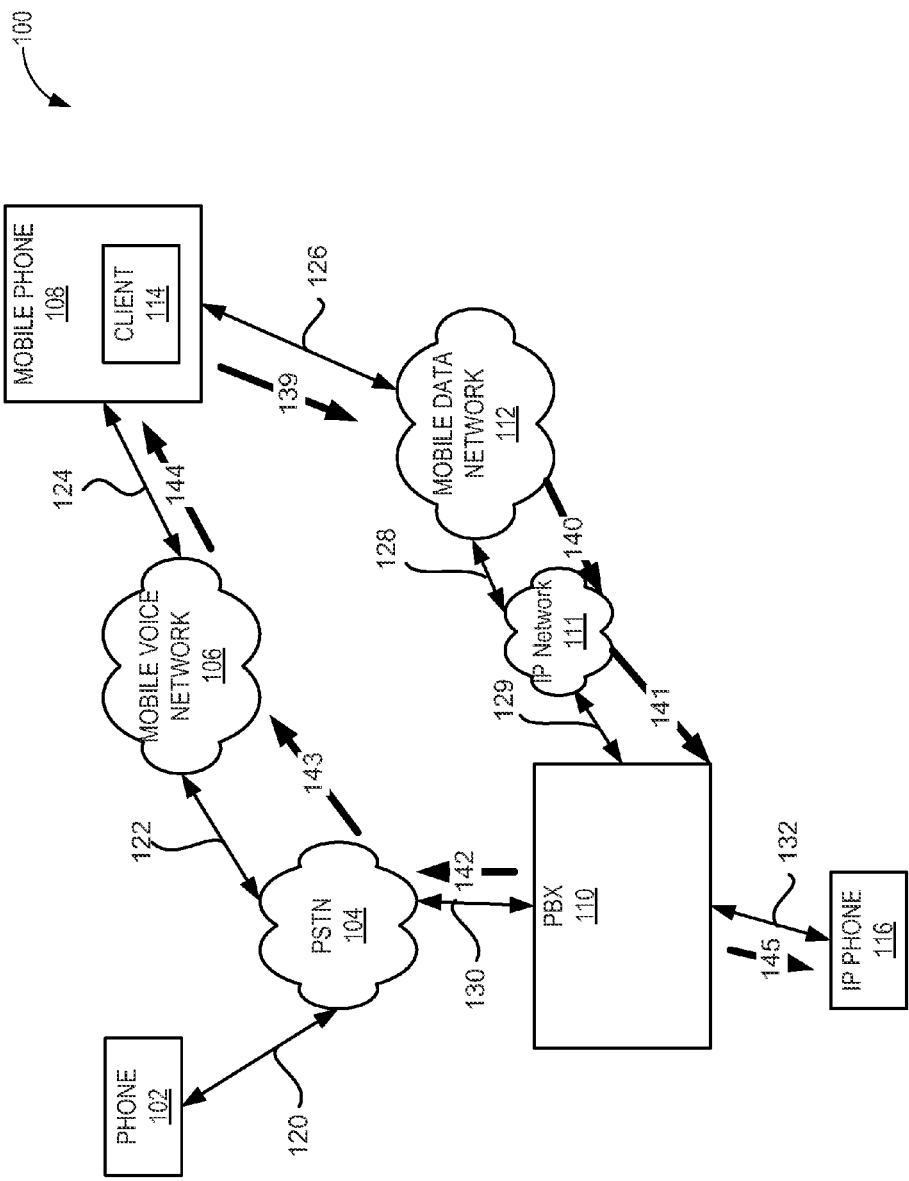
FIG. 1A is a high-level block diagram illustrating a prior art distributed telephony system having a prior art PBX.

A system and method for integrating private branch exchange functionality for mobile phones in a distributed telephony system is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. For example, the present invention is described in one embodiment below with reference to user interfaces and particular hardware. Furthermore, the present invention is described below largely in the context of voice communication. However, those skilled in the art will recognize that the principles of the present invention apply equally for video communication as well.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most, effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Enterprises often have several offices or call centers that are located in a plurality of disparate locations. To interconnect all of these sites, enterprise telephony systems have been developed. Enterprise telephony systems, which comprise a set of voice switches and servers, offer enterprise applications enabled by the integration of computer systems with telephony services. The software that supports the computer-integrated functionality is generally implemented as a client-server environment in which the participants or clients (distributed telephony users) communicate with a server. Computer-integrated features rely not only on a server's application platform but also on the availability of the network that connects the switches, servers and application services.

Description of Prior Art System

FIG. 1A illustrates a block diagram of a prior art distributed telephony system 100. The distributed telephony system 100 includes: a phone 102; a mobile phone 108; a client 114; a private branch exchange 110 ("PBX 110"); an IP phone 116; the Public Switched Telephone Network 104 ("PSTN 104"); a mobile voice network 106; and a mobile data network 112. These components 102, 104, 106, 108, 112, 114 and 116 are coupled by signal lines 120, 122, 124, 126, 128, 130 and 132.

One skilled in the art will note that the phone 102 and the mobile phone 108 can be at the same physical location or can be at different locations. The telephone 102 is a conventional type of telephone connected via land line 120 to the PSTN 104. The mobile phone 108 is a conventional type known to those skilled in the art and shown as being connected by signal lines 124 and 126 to a mobile voice network 106 and a mobile data network 112, respectively. Those skilled in the art will appreciate that signal lines 124 and 126 are a wireless (i.e., terrestrial- or satellite-based transceivers) transmission path to the mobile voice network 106 and the mobile data network 112.

FIG. 1A also depicts an example voice signal path and data signal path for initializing a telephone call through the PBX 110. The data signal path includes: the mobile phone 108; the client 114; the PBX 110; the IP network 111, and signal lines 126, 128 and 129. The data path is used by the mobile phone 108 to communicate with the PBX 110 for the purpose of controlling and establishing a call between the mobile phone 108 and another extension coupled to the PBX 110. More specifically, the data path includes the mobile phone 108 and the client 114 communicatively coupled to the mobile data network 112 via a signal line 126; and the mobile data network 112 communicatively coupled to the IP network 111 via signal line 128; and the IP network 111 communicatively coupled to the PBX 110 via a signal line 129. The data signal path can also be used, for example, to transmit data packets associated with text messages, instant messages, and/or electronic mail ("e-mail") between the mobile phone 108 and the PBX 110 and/or the IP phone 116. The data signal path can also be used by the mobile phone 108 to transmit and receive data from a network such as the Internet. The mobile phone sends data to establish a call through the PBX 110 as shown by arrows 139, 140 and 141.

The voice signal paths available in the system 100 include: the mobile phone 108; the phone 102; the IP phone 116; the PBX 110; and the couplings 120, 122, 124, 130 and 132 between them. More specifically, the voice signal paths include the mobile phone 108 communicatively coupled to the mobile voice network 106 via the signal line 124; the mobile voice network 106 communicatively coupled to the PSTN 104 via signal line 122; the PSTN 104 communicatively coupled to the PBX via signal line 130; the PSTN 104 also communicatively coupled to the phone 102 via the signal line 102; and the PBX 110 communicatively coupled to the IP phone 116 via the signal line 132. The voice signal path is used, for example, to transmit voice packets or signals between two or more of the mobile phone 108, the phone 102, the PBX 110 and the IP phone 116. Once the mobile phone 108 has asked the PBX 110 to initiate a call, the PBX 110 establishes a connection to the IP phone 116 as represented by arrow 145 and then the PBX 110 establishes a connection to the mobile phone 108 via the PSTN 104 and the mobile voice network 106 as depicted by arrows 142, 143 and 144. The PBX 110 completes the call by putting the two connections together.

One having skill in the art will note that signal lines 122 and 130 can each be one or more analog or digital trunk lines (e.g., a T1 or E1 interface), and signal lines 126, 128, 129 and 132 represent any transmission medium that supports an interne protocol.

The distributed telephony system 100 enables telephone calls between the mobile phone 108, the phone 102 and the IP phone 116. The mobile phone 108 generally has a mobile phone service plan in which a user of the mobile phone 108 can make phone calls to other phones such as the phone 102 and the IP phone 116 for a predetermined number of minutes each month. For example, for any calendar month a user of the mobile phone 108 can talk to a phone such as the IP phone 116 for 100 minutes in exchange for the user paying a monthly fee to a mobile phone service provider. The user typically must pay a relatively high fee for every minute over 100 minutes. Minutes are only deducted from the user's plan when the phone calls originate from the mobile phone 108; minutes are not deducted from the plan when other phones call the mobile phone 108. It is therefore desirable to have phone calls originate on devices other than the mobile phone 102 since such calls do not deduct minutes from the user's mobile phone service plan.

The PBX 110 is a conventional private branch exchange. The PBX 110 is capable of providing PBX functionality to IP phone 208. However, the PBX 110 is not capable of providing PBX functionality to mobile phones such as mobile phone 108.

The IP phone 116 is a conventional interne protocol phone that communicates with the PBX 110 to use Voice over Internet Protocol ("VOIP") technology to make phone calls and execute PBX functions enabled by the PBX 110.

The mobile data network 112 is one or more wireless networks configured to transmit data such to different phones and/or networks. For example, the mobile data network 112 transmits text messages, instant messages, e-mail and data associated with browsing a network such as the Internet. The mobile data network 112 is not configured to transmit data packets of voice information. In other words, the mobile data network 112 cannot transmit voice data associated with telephone calls. For example, the mobile data network 112 is a 3G network.

The client 114 is software and routines operable on a processor for allowing the mobile phone 108 to connect a phone call to the IP phone 116 without using minutes on the user's mobile phone service plan. The mobile phone 108 uses the client 114 to send a message to the PBX 110 having a special code that instructs the PBX 110 to connect a call between the mobile phone 108 and the IP phone 116. The PBX 110 originates calls to both the mobile phone 108 and the IP phone 116.

For example, a first user (not pictured) of the mobile phone 108 wants to connect to the IP phone 116 without using minutes on their mobile phone service plan. Using the client 114, the mobile phone 108 transmits 140 a message to the mobile data network 112. The mobile data network 112 transmits 141 the message to the PBX 110. The message includes a code to signal the PBX 110 to connect the IP phone 116 to the mobile phone 108. The PBX 110 transmits 142 a call for the mobile phone 108 to the PSTN 104. The PSTN 104 transmits 143 the call to the mobile voice network 106. The mobile voice network 106 transmits 144 the call to the mobile phone 108. The PBX 110 transmits 145 a call to the IP phone 116 and the mobile phone 108 is connected to the IP phone 116. This is an incoming call for the mobile phone 108. Thus, the mobile phone 108 can connect phone calls to the IP phone 116 without using minutes from the mobile phone's service plan.

A first problem with the above described example is that there are hundreds, perhaps thousands, of different models of mobile phones 108, and each client 114 typically only works on a single model. It would therefore be advantageous to have a telephony system in which the mobile phone 108 could connect phone calls with phones without using minutes from the mobile phone's service plan and without requiring a client 114 to be installed on the mobile phone 102.

A second problem with the above-described example is that existing PBXs 110 have difficulty providing PBX-functionality to the mobile phone 108. In particular, existing PBXs 110 have limitations that make them virtually unusable for many important PBX functions. A first limitation is that the mobile data networks are slow and have high latency so the responsiveness of the client application, and hence its usability, is compromised. A second limitation is that some features are only possible if the client application is always running in the mobile phone and this may not be possible on some mobile phones. Having the client application always running is a drain on the battery (because the client application must be constantly exchanging messages with the PBX over the mobile data network). One significant feature where the client application always needs to be running is call screening. On an incoming call to the mobile phone user, a message could be sent by the PBX 110 to the client application. The client application could then prompt the mobile phone user if he/she wanted to answer the call, send it to voicemail, transfer it to their admin, etc. But this is only effective if the client application is always running. A third limitation is the use of DTMF codes when a mobile data network is not accessible. In this situation, the mobile phone user can press a series of keys on their mobile phone, e.g. "*23", and the PBX 110 will recognize the DTMF tones as invoking some PBX operation (This assumes that every call involving the mobile phone, including mobile phone to PSTN calls, has a voice path that traverses the PBX, aka "tromboning"). The difficulty is that the end-user will need to memorize a different set of obscure key sequences for each PBX operation. In some cases, the client application can be enhanced so that it will generate the appropriate key sequences and the end user can invoke a PBX operation using a GUI provided by the client application. Either way however, the remote party (i.e. the person that mobile phone user is talking to), will hear these "unfriendly" DTMF tones. Furthermore, such a workaround would be limited to certain PBX features that can be provided using DTMF tones such as (1) call conferencing, (2) call park, (3) call transfer, (4) call hold/unhold.

It would therefore be advantageous to have a telephony system that included a PBX system capable of providing PBX functionality to mobile phones 108.

System Overview

Figure 1B:
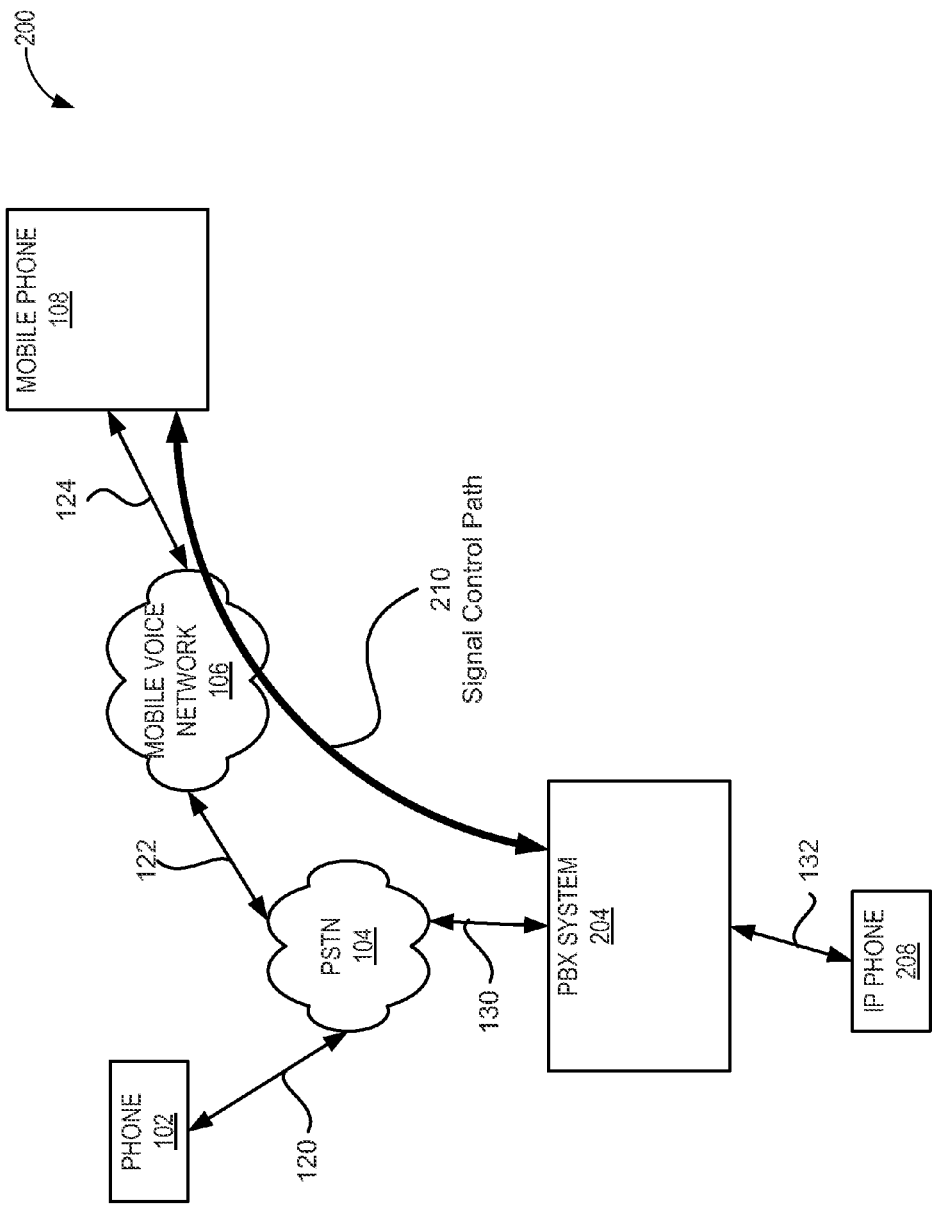
FIG. 1B is a high-level block diagram illustrating a telephony system having a signal control path and a PBX system configured to provide PBX functionality for mobile phones according to one embodiment of the present invention.

Referring now to FIG. 1B, a first embodiment 200 of the present invention is described. FIG. 1B illustrates a distributed telephony communication system 200 arranged in an example configuration including: a phone 102; a mobile phone 108; a private branch exchange system 204 ("PBX system 204"); an IP phone 208; the Public Switched Telephone Network 104 ("PSTN 104"); a mobile voice network 106; a signal control path 210; and signal lines 120, 122, 124, 130 and 132.

It should be noted that the signal control path 210 and the PBX system 204 of the first embodiment 200 are not included in the telephony system 100 depicted in FIG. 1A. According to one embodiment of the present invention, the PBX system 204 of the first embodiment 200 is configured to provide PBX functionality to (1) one or more IP phones such as the IP phone 208 and (2) one or more mobile phones such as mobile phone 108. The PBX system 204 is communicatively coupled to the mobile phone 108 via the signal control path 210 and provides PBX functionality to mobile phones such as the mobile phone 108 using the signal control path 210. The IP phone 208 is a conventional IP phone configured to work with the PBX system 204.

The signal control path 210 represents a control signal path between the mobile phone 108 and the PBX system 204 for enabling the integrated functions of the present invention. The signal control path 210 communicatively couples the mobile phone 108, the mobile voice network 106, and PBX system 204. In various embodiments, the signal control path 210 is a direct trunk line, an internet protocol network (herein, "IP network"), a mobile data network, a mobile voice network, any other coupling between the mobile phone 108 and PBX system 204, or combination of the above. Specific embodiments for the signal control path 210 are described below with reference to FIGS. 2A-3F.

In contrast, the PBX 110 depicted in FIG. 1A is a conventional PBX 110 that is only capable of providing PBX functionality to the IP phone 116. The PBX 110 is not capable of providing PBX functionality to one or more mobile phones such as mobile phone 108.

It should also be noted that the mobile phone 108 of the first embodiment 200 does not need or use a client 114 to enable the PBX functionality. Furthermore, although only one mobile phone 108 is depicted in FIG. 1B, in practice their can be hundreds, or even thousands, of mobile phones 108 communicatively coupled to the PBX system 204.

The phone 102 is a conventional telephone that uses the PSTN 104 to allow a user to carry on, phone calls with other phones such as the mobile phone 108, the IP phone 208, a softphone (not pictured) and/or other phones similar to phone 102. For example, the phone 102 is an analog phone.

The mobile phone 108 is a conventional mobile phone that uses the mobile voice network 106 to allow users to carry on phone calls with other phones such as the phone 102, the IP phone 208, a softphone (not pictured) and/or other mobile phones similar to mobile phone 108. The mobile phone 108 has a processor and memory and stores software and routines that act on the processor to enable the mobile phone 108 to communicate using the mobile voice network 106 and other data network. For example, a mobile data network (not shown in FIG. 1B) is used by the mobile phone 108 to allow a user to browse a network such as the Internet or send and receive text messages, instant messages and/or email. The mobile phone 108 also stores software and routines that act on the processor to enable the mobile phone 108 to browse a network such as the Internet. For example, the mobile phone 108 is a digital mobile phone or an analog mobile phone. In another embodiment, the mobile phone 108 stores software that includes an API that allows the mobile phone 108 to communicate with the PBX system 204 using Short Message Service (SMS). For example, presence information is transmitted to the PBX system 204 as if it were another mobile phone with SMS. The mobile user's service provider also associates the PBX's phone number with the mobile user. In one embodiment, the SMS interface is made available on the internet or the mobile data network as well as the mobile voice network—which is where SMS is provided.

The PBX system 204 is a non-conventional private branch exchange system that has a processor and memory that stores software and routines that act on the processor to enable the IP phone 208 and the mobile phone 108 to make VoIP phone calls and to execute PBX functionality. For example, as described below with reference to FIGS. 2A-3F, the mobile phone 108 is communicatively coupled to the PBX system 204 via the signal control path 210. The mobile phone 108 transmits or receives call control signals to or from the PBX system 204 requesting PBX functionality for the mobile phone 108. The PBX system 204 receives these signals and responds by providing the requested PBX functionality to the mobile phone 108. Also described below with references to FIGS. 2A-2C and 3A-3F, the software and routines stored on the PBX system 204 are executed by a processor to enable the mobile phone 108 to connect phone calls with phones such as IP phone 208 without using minutes from the mobile phone's service plan and without requiring a client such as client 114 to be installed on the mobile phone 108.

In one embodiment, the PBX system 204 includes a processor. The processor can be a conventional processing device, such as a general-purpose microprocessor. The PBX system 204 also includes a memory that stores software and routines that act on a processor to enable the IP phone 208 and the mobile phone 108 to make VOIP phone calls and to execute PBX functionality. In one embodiment, the PBX system 204 is a hardware server adding software executable by the hardware server to perform the call control and routing functions. This will be described further with reference to FIGS. 2A-2C and 3A-3F. The PBX system 204 also includes applications for recording presence and history of presence. In one embodiment described below, the mobile phone presence is continually fed to the PBX system 204 similar to an IP phone 208. The PBX system 204 then the records the presence information. PBX users that have permission to see a mobile user's presence can then see the state of the mobile user. Looking at the state over time may reveal just how long the user has been at a location and how long the phone has been set to do not disturb. In yet another embodiment, the PBX system 204 includes a database for storing a list of personal phone numbers of the user that will not be controlled by the PBX system 204. The mobile user may wish certain calls to be personal and not controlled by the PBX. The user can put these numbers into the PBX database, and then the PBX will not maintain call control, nor maintain a call record.

The IP phone 208 is an interne protocol phone configured to communicate with the PBX system 204 to use VOIP technology to make phone calls and execute PBX functions enabled by the PBX system 204. The IP phone 208 is configured to enable a user to carry on phone calls with other phones such as the phone 102, the mobile phone 108, a softphone (not pictured), and other IP phones. In one embodiment, IP phone 208 has an identical structure, coupling and functionality as IP phone 116.

Although only one phone 102, one mobile phone 108, one PBX system 204 and one IP phone 208 are depicted in configuration shown in FIG. 1B, one having skill in the art will recognize that in practice other configurations may have any number of phones 102, mobile phones 108, PBX systems 204 and/or IP phones 208. For example, a person having ordinary skill in the art will recognize that multiple IP phones 208 can be communicatively coupled to the PBX system 204. Each IP phone 208 can have a four digit PBX extension that is unique to that particular IP phone 208. For example, one hundred IP phones are communicatively coupled to the PBX system 204 and PBX extensions numbers ranging from 0000-9999 are assigned and associated with each particular IP phone 208. Accordingly, if a user of a first IP phone having extension number 0024 desires to call a second IP phone having extension number 0085, the user simply dials extension number 0085 to connect a PBX call to the second extension.

The PSTN 104 is a conventional public circuit-switched telephone network or a portion thereof.

The mobile voice network 106 is one or more cellular networks configured to transmit voice packets to different phones via the one or more cellular phone networks. For example, the mobile voice network 106 is one or more cellular telephone networks. Those skilled in the art will recognize that the mobile voice network 106 may also be a femtocell or access point base station on the businesses premises. In such an embodiment, the mobile phone 108 communicates directly with the femtocell and the femtocell is coupled to the PBX system 204.

In the illustrated embodiment 200, the mobile phone 108 is communicatively coupled to the mobile voice network 106 via signal line 124. The mobile phone 108 sends data to the mobile voice network 106 and receives data from the mobile voice network 106 via the signal line 124. For example, the mobile phone 108 sends data packets having voice transmission data associated with a phone call from the mobile phone 108 to the mobile voice network via the signal line 124.

The mobile voice network 106 is communicatively coupled to the PSTN 104 via signal line 122. The mobile voice network 106 transmits data to the PSTN 104 and receives data from the PSTN 104 via signal line 122. For example, the mobile voice network 106 transmits data packets having voice transmission data associated with phone calls to the PSTN 104 via signal line 122.

The PSTN 104 is communicatively coupled to the phone 102 via signal line 120. The PSTN 104 transmits analog signals to the phone 102 and receives analog signals from the phone 102 via signal line 120. For example, the PSTN 104 transmits analog signals representing voice transmission information associated with phone calls to the phone 102 via the signal line 120. The PSTN 104 is also communicatively coupled to the PBX system 204 via signal line 130 for transmitting and receiving data to and from the PBX system 204. For example, the PSTN 104 transmits data packets having voice transmission data associated with phone calls to the PBX system 204 via the signal line 130.

The PBX system 204 is communicatively coupled to the IP phone 208 via signal line 132. The PBX system 204 transmits data and control signals to the IP phone 208 and receives data and control signals from the IP phone 208 via the signal line 132. For example, the PBX system 204 transmits (1) data packets having voice transmission data associated with phone calls and/or (2) data packets having data associated with text messages, instant messages presence and/or e-mail to the IP phone 208 via the first phone extension line 132.

This embodiment 200 shows how the present invention is used to enable PBX functionality without use of an integration device 308 in the mobile voice network 106 or an IP network 302 (See FIGS. 3A-F). This is particularly advantageous because it requires no modification of the mobile voice network 106 or existing infrastructure. It only requires a PBX system 204 with the capability to enable the mobile phone 108 to execute PBX functionality. For example, calls from the IP phone 208 to the mobile phone 108 and vice versa have PBX functionality automatically and do not require a new interface. In such an embodiment, the control signaling described in detail below is sent by SMS or other protocol that can be delivered across the mobile voice network 106. For PBX functionality that occurs during a call or mid-call, the interface is delivered by the PBX system 204 to the mobile phone 108 via SMS signaling or other protocol that can be delivered across the mobile voice network 106.

Figure 1C:
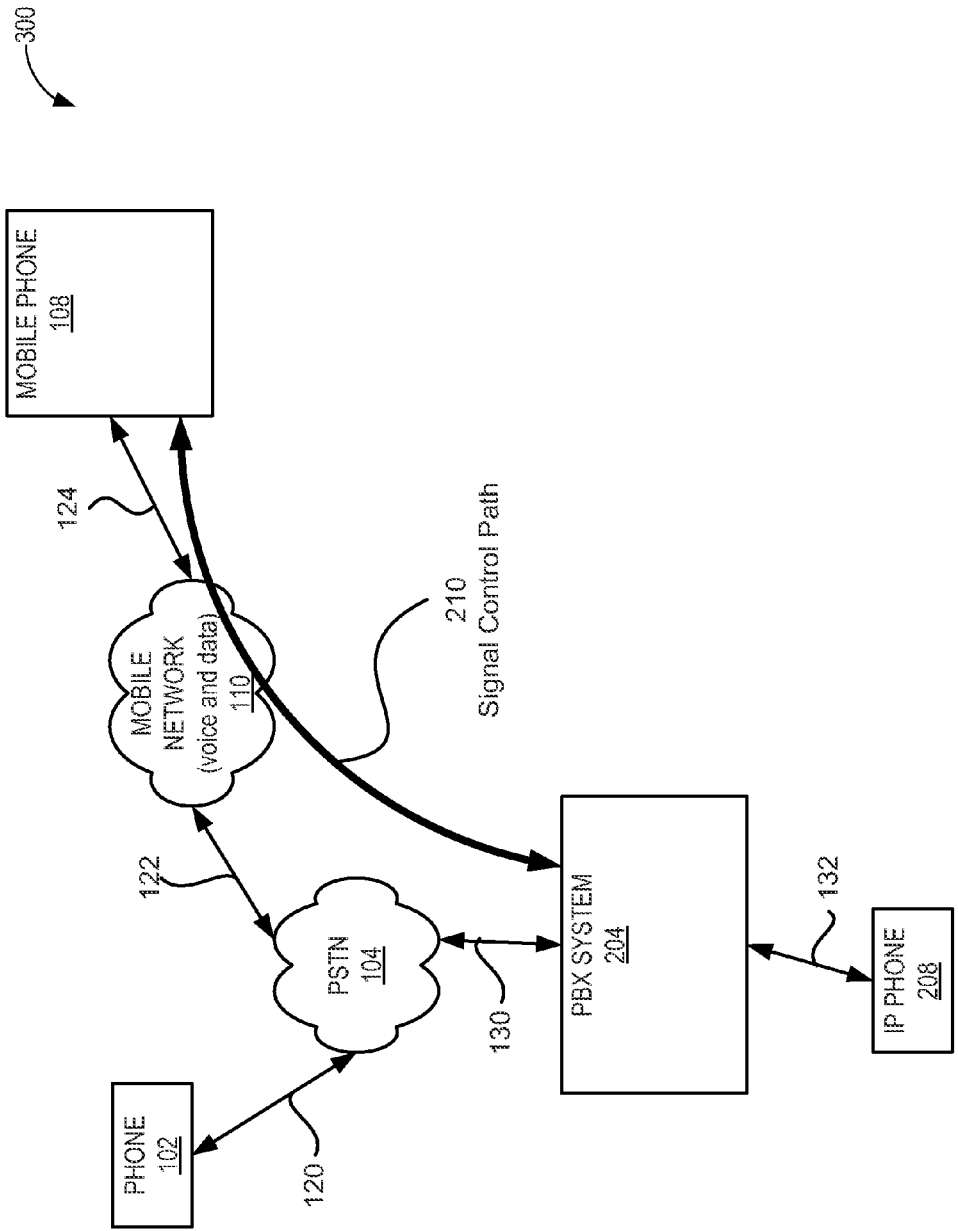
FIG. 1C is a high-level block diagram illustrating a telephony system having a signal control path and a PBX system configured to provide PBX functionality for mobile phones communicatively coupled to a mobile network having voice and data capability according to one embodiment of the present invention.

Turning now to FIG. 1C, a second embodiment 300 of the present invention is described. The second embodiment 300 includes similar components to the first embodiment 200 described above so that description will not be repeated here. Like reference numerals have been used for like components with similar functionality. However, this embodiment 300 substitutes a mobile network 110 for the mobile voice network 106. The mobile network 110 provides similar functionality as the mobile voice network 106 but is capable of transmitting both voice and data information to/from the mobile phone 108. For example, the mobile network 110 is a 4G network with enhanced messaging capabilities in this embodiment. In other embodiments the mobile network 110 includes a 3G or 2G network.

Figure 2A:
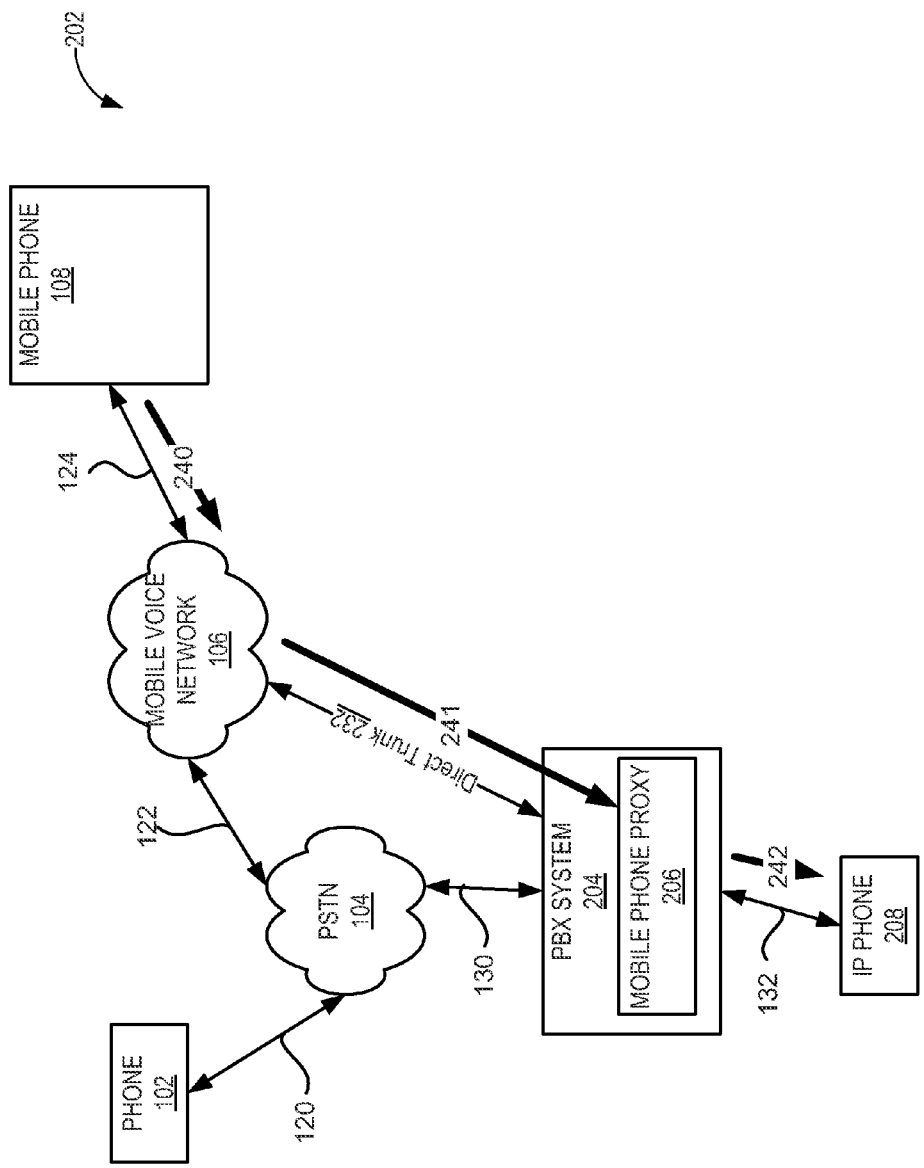
FIGS. 2A-2C are block diagrams illustrating a telephony system having a mobile phone proxy and a direct trunk line for integration of PBX functionality for mobile phones according to one embodiment of the present invention.

Turning now to FIG. 2A, a third embodiment 202 of the present invention is described. The third embodiment 202 includes similar components to the first embodiment 200 described above so that description will not be repeated here. Like reference numerals have been used for like components with similar functionality. However, this embodiment 202 includes a direct trunk line 232 between the mobile voice network 106 and the PBX system 204. The direct trunk line 232 is a conventional trunk line (such as but not limited to a SIP or T1 trunk) that communicatively couples the mobile voice network 106 and the PBX system 204 (and the mobile phone proxy 206). The third embodiment also includes a mobile phone proxy 206 stored in the memory of the PBX system 204. The mobile phone proxy 206 is software and routines that act on one or more processors associated with the PBX system 204 to enable the mobile phone 108 to execute PBX functionality.

The functionality of the mobile phone proxy 206 will now be described with reference to FIGS. 2A-2C and 3A-3F. The functionality of the direct trunk line is described only with reference to FIGS. 2A-2C. FIG. 2A depicts an embodiment 202 in which a phone call is initiated by the mobile phone 108 to the IP phone 208. The mobile phone 108 initiates a phone call to the IP phone 208. For example, the IP phone 208 has a four digit PBX extension number 0085 and a user of the mobile phone 108 enters the four digit PBX extension number 0085 into a keypad of the mobile phone 108 and then initiates a call to that extension. The mobile phone 108 sends 240 the dialed PBX extension number to the mobile voice network 106 via signal line 124. For example, the mobile phone 108 sends 240 the PBX extension number 0085 to the mobile voice network 106.

The mobile voice network calls 241 the mobile phone proxy 206 using the direct trunk line 232 and provides a mobile phone ID and the dialed PBX extension number. In one embodiment, the mobile phone ID is sent as a variation of caller ID on the trunk. In other embodiments, the mobile phone ID is sent as part of other call control protocols. The mobile phone ID is a unique identifier associated with mobile phone 108 (such as a combination of the device's electronic serial number and its associated telephone number) that identifies that a particular phone call originates from the mobile phone 108. The incoming request on the direct trunk line 232 includes establishing an actual incoming call from the mobile phone through the mobile voice network to the PBX system 204. The mobile phone proxy 206 then calls 242 the IP phone 208 via the signal line 132. For example, the mobile phone proxy 206 determines which IP phone 208 is being called based on the PBX extension number received from the mobile voice network 106, and establishes a call to that extension.

The mobile phone proxy 206 next connects the call to the IP phone 208 with the incoming call from the mobile phone 108. Thus, in this embodiment 202 the mobile phone 108 can, among other things, connect a phone call to the IP phone 208 by calling the PBX extension associated with the IP phone 208.

Figure 2B:
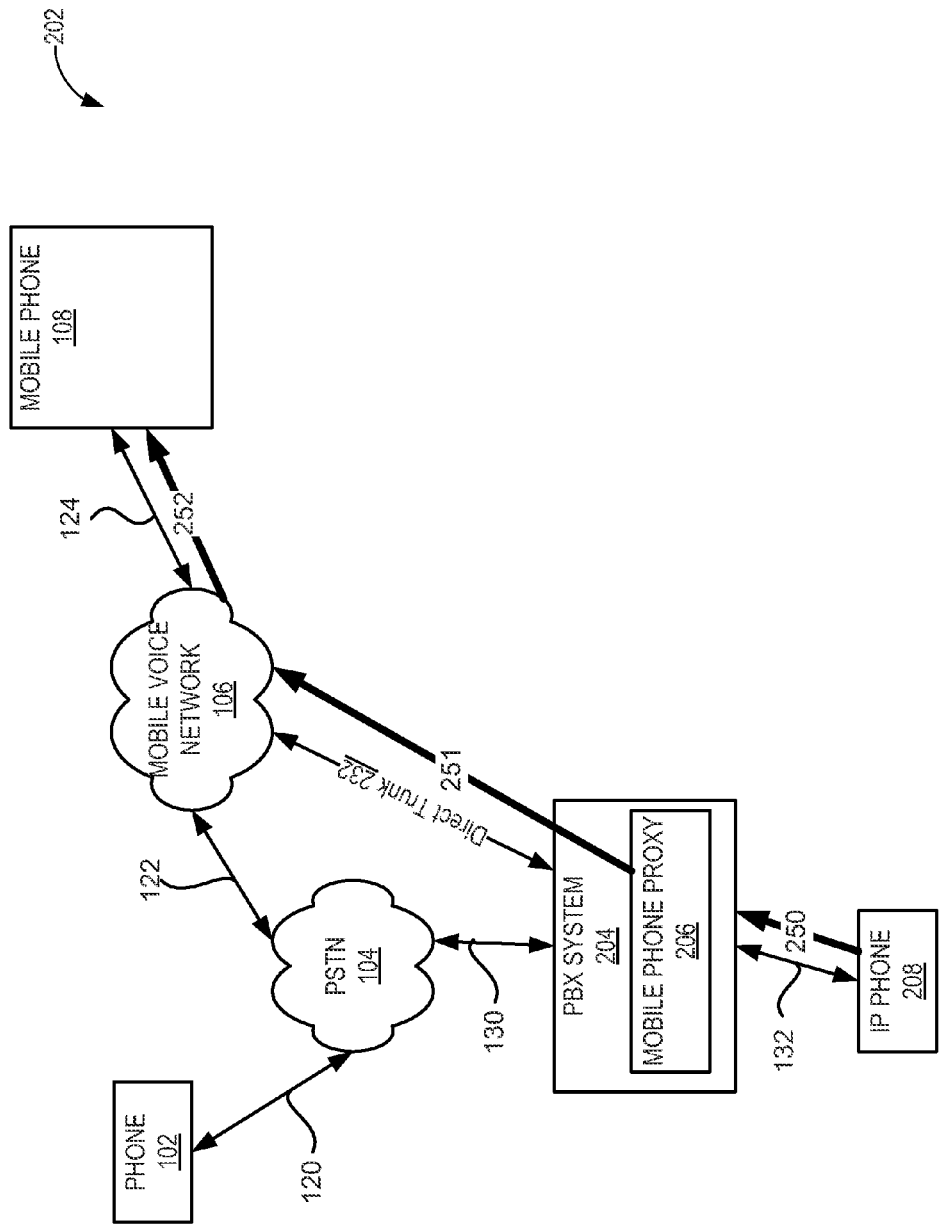

FIG. 2B depicts an embodiment 202 of the present invention in which a phone call is initiated by the IP phone 208 to the mobile phone 108. The IP phone 208 initiates a phone call to the mobile phone 108. For example, the mobile phone 108 has a four digit PBX extension number 0024 and a user of the IP phone 208 enters the four digit PBX extension number, for example number 0024, into a keypad of the IP phone 208 and then initiates a call to that extension.

The IP phone 208 sends 250 the dialed PBX extension number to the mobile phone proxy 206 via signal line 132. For example, the IP phone 208 sends 250 the PBX extension number 0024 to the mobile phone proxy 206 via the first phone extension line 132.

It is assumed that the user associated with the extension has configured the PBX system 204 to direct the call to the user's mobile phone (mobile phone 108), as opposed to the IP phone (not shown) normally associated with the user's extension. In one embodiment, the mobile user may not even have an IP phone, and the mobile phone 108 is the user's phone on the PBX system 204. The mobile phone proxy 206 calls 251 the mobile voice network 106 using the direct trunk line 232. The mobile voice network 106 calls 252 the mobile phone 108 via signal line 124. The mobile voice network 106 connects the call to the mobile phone 108 with the IP phone 208. Thus, in this embodiment 202 the IP phone 208 can, among other things, connect a phone call to the mobile phone 208 by calling a PBX extension associated with the mobile phone 108.

Figure 2C:
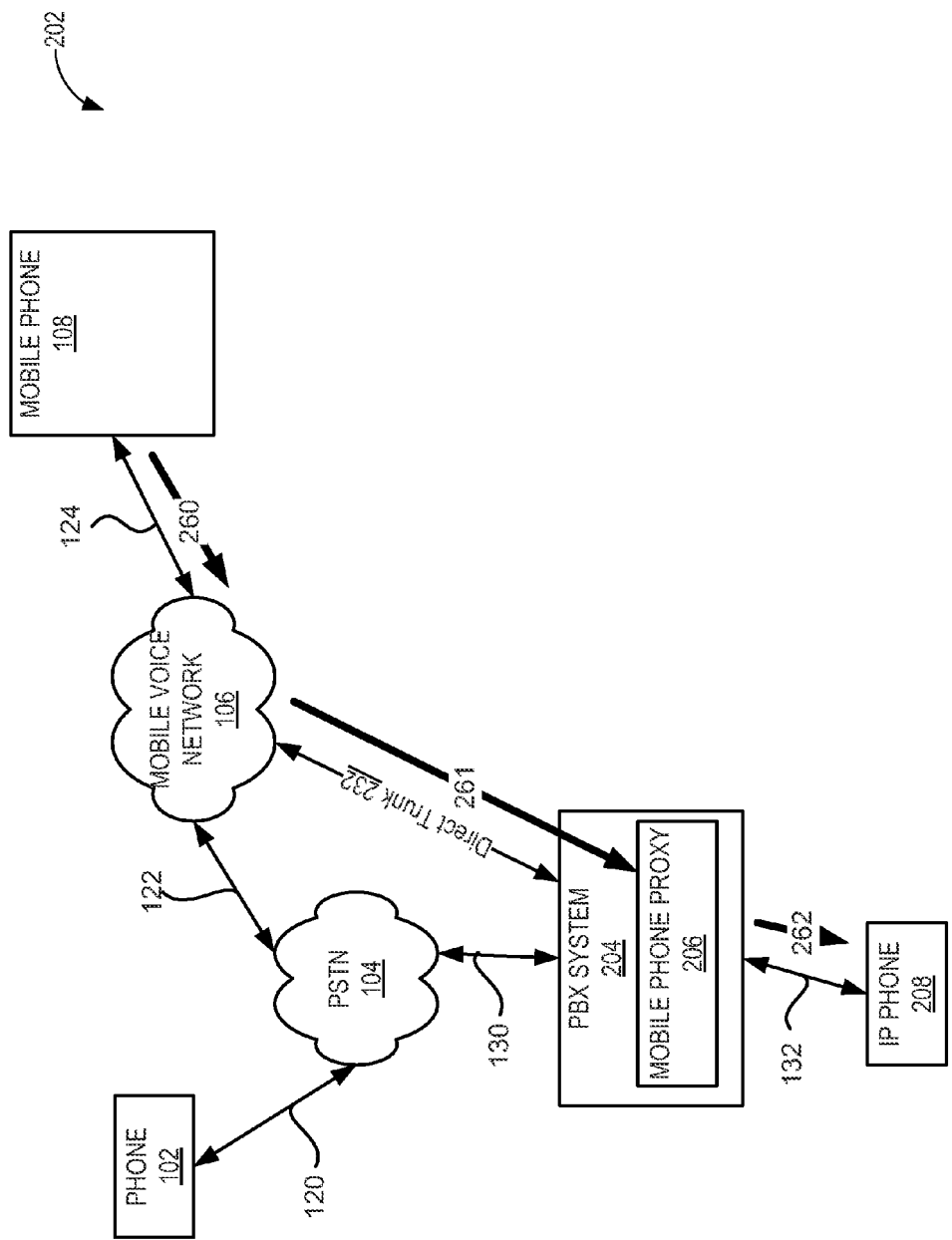

FIG. 2C depicts an embodiment 202 of the present invention in which the mobile phone 108 initiates PBX functionality in association with an already established phone call between the mobile phone 208 and the IP phone 108. The mobile phone 108 initiates a call control operation. A call control operation is a PBX function such as but not limited to: (1) selectable phone lines; (2) remote answer from application; (3) remote answer selected media path (e.g., handset, speaker, headset, Bluetooth); (4) indicator of PBX phone number, extension number; (5) send incoming call to voicemail; (6) divert call; (7) answer additional call/return to calls on hold; (8) blind transfer; (9) consultative transfer; (10) intercom transfer; (11) transfer to mailbox; (12) intermediate conference; (13) consultative conference; (14) conference additional parties; (15) conference—create ad hoc conference call; (16) conference—join conference call; (17) intercom; (18) hold; (19) barge in; (20) bridged call appearance; (21) page; (22) park; (23) park and page; (24) pickup; (25) pickup night bell; (26) pickup/unpark; (27) record call; (28) record extension; (29) send digits over call; (30) silent monitor; (31) transfer whisper; (32) unpark; (33) whisper page; (34) Centrex Flash; (35) Ringdown—One-to-One Hotline; (36) Ringdown—One-to-Many Hotline (aka hoot 'n holler); (37) Handset Lift Ringdown; (38) Silent Coach; (39) Whisper Page Mute; (40) Answer Monitored Extension's Call; (41) Night Bell Pickup; (42) Overhead Paging; (43) User Group Paging; (44) Contact center login/logout; (45) music on hold; (46) call blocking; and (47) call camping. A person having ordinary skill in the art will recognize that the above-described list of PBX functionality is not exclusive and is provided only as an example of different PBX functionality possible with the present invention. For example, a user of the mobile phone 108 presses a button on the phone's keypad that places the ongoing call with the IP phone 208 on hold. In another example, the user of the mobile phone 108 presses a button on the mobile phone 108 that toggles through menus displayed on the phone's display, and the user selects a display option that places the ongoing call with the IP phone 208 on hold. A person having ordinary skill in the art will appreciate that there are numerous ways for a user of the mobile phone 108 to initiate PBX functionality from the mobile phone 108.

As noted above, it is assumed that there is an existing call between the IP phone 208 and the mobile phone 108 through the PBX system 204. The mobile phone 108 next sends 260 a call control command to the mobile voice network 106 via signal line 124. The call control command is a command that indicates a PBX function requested by the mobile phone 108. The mobile voice network 106 receives the call control command. The mobile voice network 106 sends 261 the call control command to the mobile phone proxy 206 via the direct trunk line 232.

The mobile phone proxy 206 receives the call control command and causes the PBX system 204 to execute the requested call control operation. In one embodiment, the specific requested PBX function is initiated by the PBX system 204 using an associated call control operation.

For example, if the call control command indicates that the mobile phone 108 requests to place the ongoing phone call with the IP phone 208 on hold, the mobile phone proxy 206 receives the call control command, the mobile phone proxy 206 determines that the mobile phone 108 is requesting that the call be placed on hold based at least in part on the call control command, and the mobile phone proxy 206 executes a call hold operation using the PBX system 204 that places the ongoing call on hold. Thus, in this embodiment 202 the mobile phone 108 can, among other things, initiate PBX functionality for ongoing phone calls established between the mobile phone 108 and the IP phone 208.

In addition to outbound calls from the mobile phone, inbound calls to the mobile phone and call control operations on active mobile phone calls, other PBX operations require event notifications to be sent to/from the mobile phone. Operations such as (1) call screening, (2) camp on, (3) extension monitoring and (4) call pickup require event notifications to be sent to/from the mobile phone 108. Event notifications to the mobile phone 108 cause the end user to perform some action. Similarly, event notifications from the mobile phone 108 cause the PBX system 204 to perform some action. For example, the mobile phone 108 is configured to monitor a PBX extension such as the extension for the IP phone 208. When there is a call for that PBX extension, the mobile phone proxy 206 generates a notification message to the mobile voice network 106. The mobile voice network 106 sends an "alert" to the mobile phone 108 indicating to the end user that there is an incoming call to the PBX extension. The alert is a message indicating to the mobile phone 108 user that there is an incoming call to the PBX extension. The end user can then pickup (e.g., answer) the call by responding to the alert on the mobile phone 108. Responsive to the user picking up the call, a message is sent from the mobile phone 108 back to the mobile phone proxy 206 through the mobile voice network 106 and the call that was originally intended for the PBX extension is redirected to the mobile phone 108.

In another example, a user of a PBX connected device such as the IP phone 208 wants to contact a mobile phone 108 user who is currently on an active phone call, so the IP phone 208 user performs a camp-on operation. When the mobile phone 108 hangs up, the mobile voice network 106 detects the hang-up and sends a notification event to the mobile phone proxy 206 that the mobile phone 108 is inactive. The mobile phone proxy 204 can then alert the IP phone 208 user and connect the IP phone 208 user to the mobile phone 108 in a manner similar to the way an IP phone 208 originated call works.

Figure 3A:
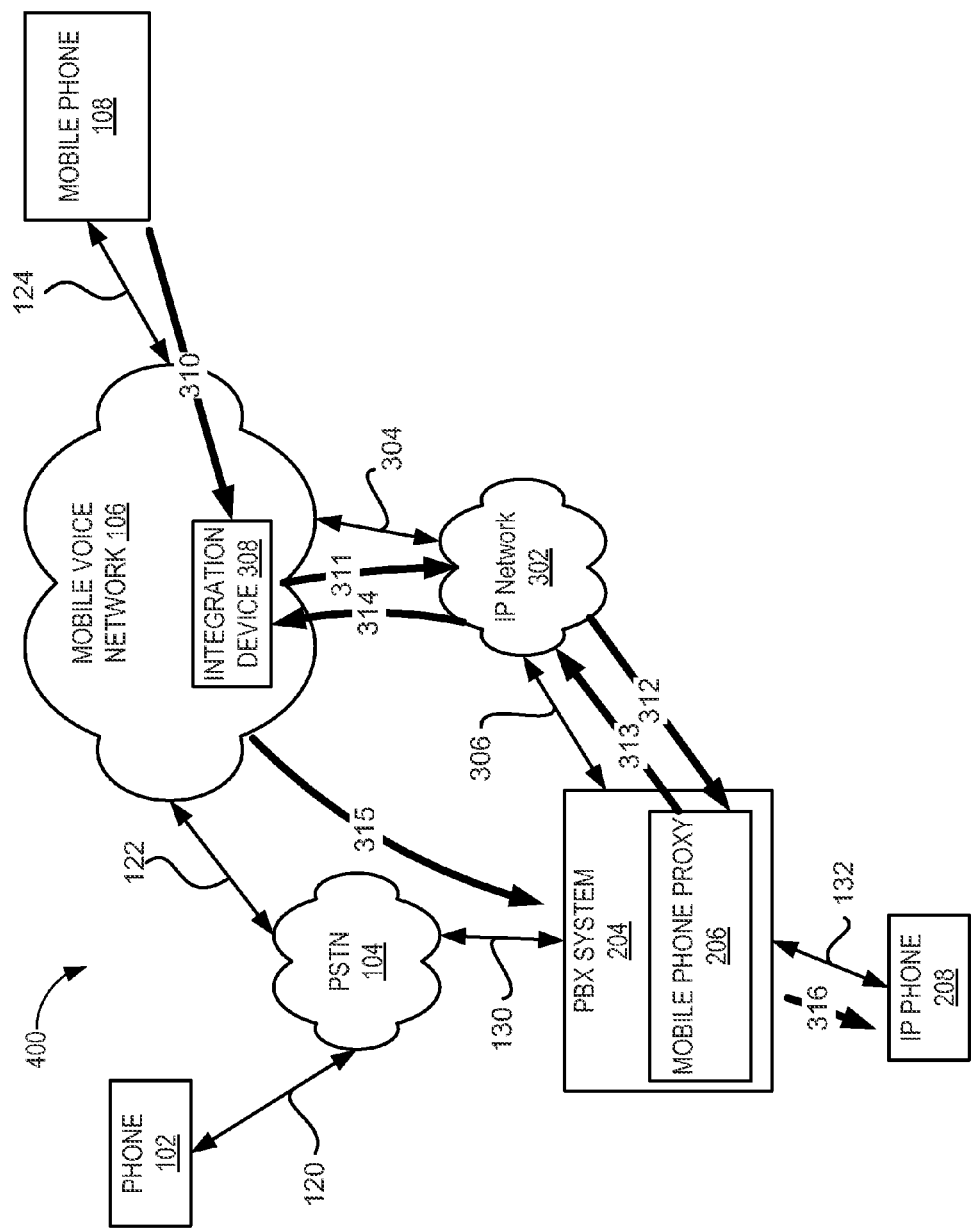
FIG. 3A-3F are block diagrams illustrating a telephony system having a mobile phone proxy and an integration device for integration of PBX functionality for mobile phones using an IP network according to one embodiment of the present invention.

Turning now to FIG. 3A, a fourth embodiment 400 of the present invention is described. The fourth embodiment 400 includes similar components to the first embodiment 200 described above so that description will not be repeated here. Like reference numerals have been used for like components with similar functionality. However, this embodiment 400 of the system does not include a direct trunk line 232 between the mobile voice network 106 and the PBX system 204.

The fourth embodiment 400 of the present invention includes an integration device 308 that is operable in the mobile voice network 106. The integration device 308 is a system for allowing the mobile phone 108 to use PBX functionality. In one embodiment of the present invention, the integration device 308 is a processor-based system with a processor and a memory storing software and routines executable upon the processor to enable the mobile phone 108 to make VOIP phone calls and execute PBX functionality.

The fourth embodiment 400 of the present invention also includes an IP network 302. The IP network 302 is preferably a wide area network or a similar data network. In another embodiment, the IP network 302 is an IP-based wide or metropolitan area network. The IP network 302 can also be a private network or include one or more distinct or logical private networks (e.g., virtual private networks or wide area networks). In one embodiment, the IP network 302 includes SIP signaling and Wi-Fi or other wireless IP network to the mobile phone. The mobile voice network 106 is communicatively coupled to the IP network 302 via a first communication link 304. The PBX system 204 is communicatively coupled to the IP network 302 via a second communication link 306. The communication links 304, 306 to and from the network 302 can be wire line or wireless (i.e., terrestrial- or satellite-based transceivers). The functionality of the integration device 308 and the IP network 302 will now be described with reference to FIGS. 3A-3F.

FIG. 3A depicts an embodiment 400 of the system in which a phone call is initiated by the mobile phone 108 to the IP phone 208. The mobile phone 108 initiates a phone call to the IP phone 208. For example, the IP phone 208 has a four digit PBX extension number 0085 and a user of the mobile phone 108 enters the four digit PBX extension number 0085 into a keypad of the mobile phone 108 and then initiates a communication to that extension. The mobile phone 108 sends 310 the dialed PBX extension number to the integration device 308 via the signal line 124. For example, the mobile phone 108 sends 310 the PBX extension number 0085 to the integration device 308 via signal line 124.

In one embodiment, the mobile phone 108 initiates the phone call to the IP phone 208 by sending 310 a dialed or PSTN number to the integration device 308. The integration device 308 receives the dialed number. The integration device 308 sends 311 the dialed number and the mobile phone ID to the IP network 302 via the first communication link 304. The IP network 302 receives the initiation number and the mobile phone ID. The IP network 302 sends 312 the initiation number and the mobile phone ID to the mobile phone proxy 206 via the second communication link 306.

The mobile phone proxy 206 receives the dialed number and the mobile phone ID. In one embodiment, the PBX system 204 and the mobile phone proxy 206 are communicatively coupled to multiple IP phones 208. The mobile phone proxy 206 translates the dialed number into a PSTN number. That PSTN number is simply a number that terminates on a trunk connected to the PBX/mobile phone proxy. The mobile phone proxy 206 determines which one of the IP phones 208 is being called by the mobile phone 108. For example, the dialed number is associated with a particular IP phone 208 and the mobile phone proxy 206 determines which one of the IP phones 208 is being called based on the dialed number. In one embodiment, the mobile phone proxy 206 includes a translation table for translating dialed numbers to specific extensions numbers that can be used by the PBX system 204. In one embodiment, the mobile phone proxy 206 creates a call association between the mobile phone 108 and the called IP phone 208 based in part on the mobile phone ID number and/or the dialed number. A call association is an association used by the mobile phone'proxy 206 to determine which extension to connect to a call from the integration device to the connection number, thereby connecting the mobile phone 108 to the IP phone 208.

The mobile phone proxy 206 sends 313 a connection number to the IP network 302 via the second communication link 306. The connection number is a number for the integration device 308 to call in order to connect a call between the mobile phone 206 to the IP phone 208. In one embodiment, the connection number includes the PBX extension number for the IP phone 208. The IP network 302 receives the connection number and sends 314 the connection number to the integration device 308 via the first communication link 304.

The integration device 308 receives the connection number. The integration device 308 calls the connection number and connects the mobile phone 108 to the call.

The integration device 308 calling the connection number also creates an incoming call at the PBX system 204 from the integration device 308. The mobile phone proxy 206 associates the incoming call with the mobile phone 108. The mobile phone proxy 206 connects the IP phone 208 with the incoming call. Upon this connection being made, the mobile phone 108 and the IP phone 208 are connected on a phone call. Thus, according to this embodiment 400, the mobile phone 108 can, among other things, connect a phone call to the IP phone 208 by sending a dialed number to the mobile phone proxy 206.

Figure 3B:
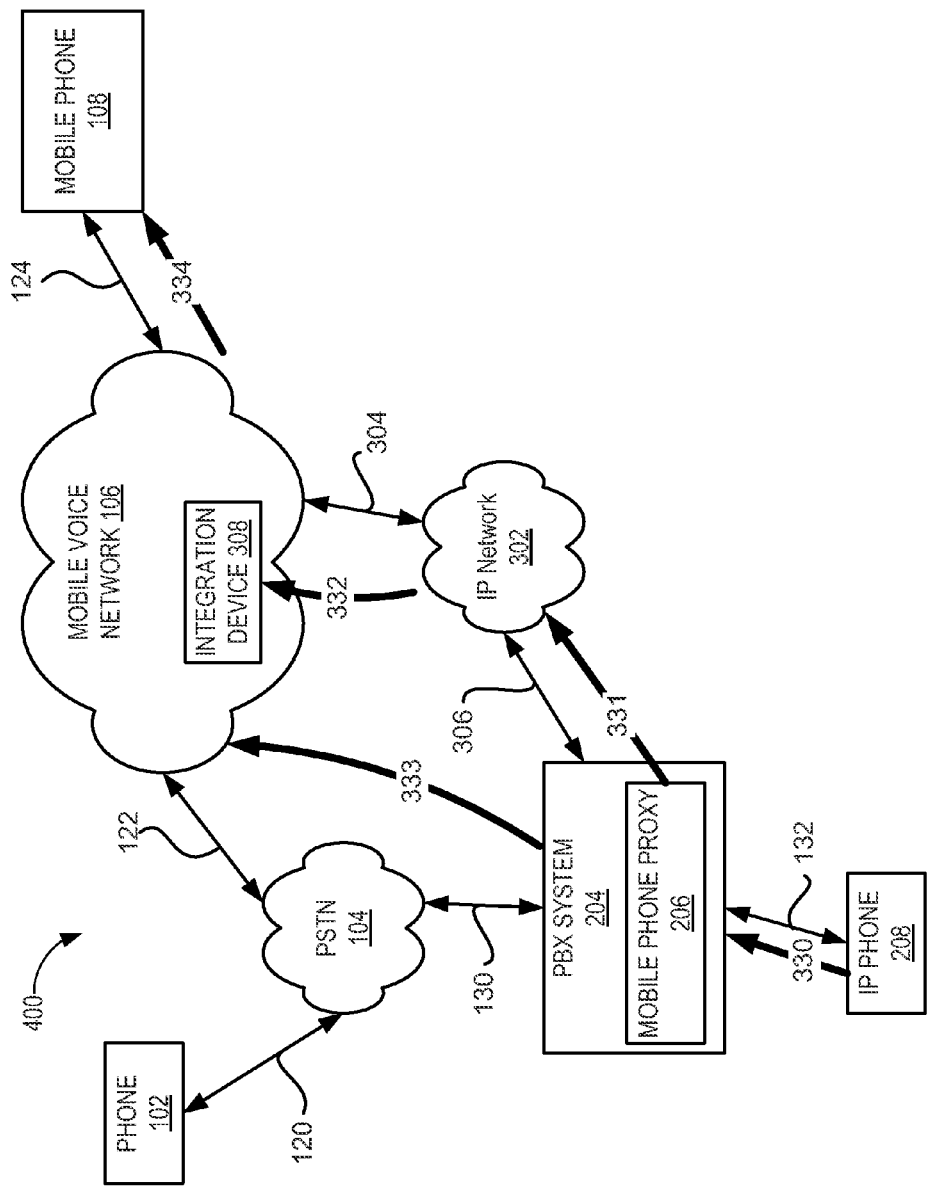

FIG. 3B depicts an embodiment 400 of the system in which a phone call is initiated by the IP phone 208 to the mobile phone 108. The IP phone 208 initiates a phone call to the mobile phone 108. For example, a user has a four digit PBX extension number 0024 and has associated with the mobile phone 108. The user of the IP phone 208 enters the four digit PBX extension number 0024 into a keypad of the IP phone 208 and then initiates a call to that extension.

The IP phone 208 sends 330 the dialed PBX extension number to the mobile phone proxy 206 via the signal line 132. For example, the IP phone 208 sends 330 the PBX extension number 0024 to the mobile phone proxy 206 via signal line 132.

The mobile phone proxy 206 sends 331 a notification of an incoming call for the mobile phone 108 to the IP network 302 via the second communication link 306. The notification is an indication to the integration device 308 that an incoming phone call for the mobile phone 108 is forthcoming. The IP network 302 receives the notification. The IP network 302 transmits 332 the notification to the integration device 308 via the first communication link. The integration device 308 receives the notification. In one embodiment, the integration device 308 stores the notification or an indication of the notification on a memory and awaits the incoming call for the mobile phone 108 over the voice network, in this case the PSTN 104.

The mobile phone proxy 206 makes a call 333 to the mobile voice network 106, specifically the integration device 308, via signal line 130, PSTN 104 and signal line 122. The integration device 308 receives the incoming call from the mobile phone proxy 206. The integration device 308 associates the incoming call with the previously received notification. In one embodiment, the notification is an indication to the integration device 308 that the incoming call is a request for the integration device 308 to connect a call between the IP phone 208 and the mobile phone 108 identified in the notification. The integration device 308 causes the mobile voice network 106 to call 334 the mobile phone 108 via signal line 124. Those skilled in the art will recognize that in other embodiments, the integration device 308 stores a record of the association between the incoming call and the previously received notification, and uses the association for subsequent PBX functions or call control operations on the established call. Similarly, the mobile phone proxy 206 stores a record of the association between the call to the mobile voice network via the PSTN and the notification that was transmitted to the integration device 308 for subsequent PBX functions or call control operations.

Figure 3C:
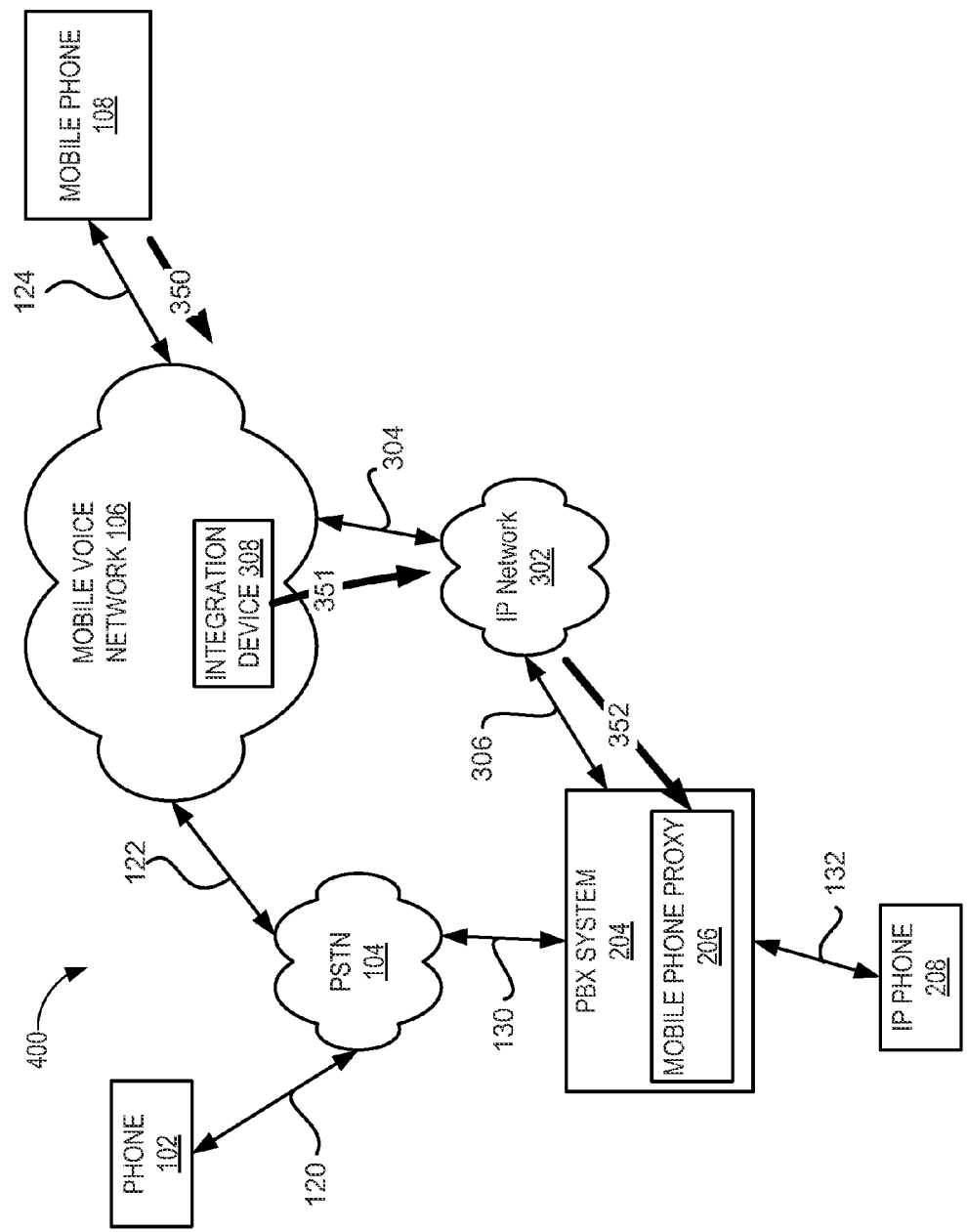

Turning now to FIG. 3C, an embodiment 400 of the system in which the mobile phone 108 initiates a PBX function or call control operation in association with an already established phone call between the mobile phone 208 and the IP phone 108. The mobile phone 108 initiates a call control operation. The mobile phone 108 sends 350 a call control command to the integration device 308 via signal line 124. The integration device 308 receives the call control command and recognizes it as applying to the previously established call between the IP phone 208 and the mobile phone 108. The integration device 308 sends 351 the call control command to the IP network 302 via the first communication link 304. The IP network 302 receives the call control command and sends 352 the call control command to the mobile phone proxy 206 via the second communication link 306.

The mobile phone proxy 206 receives the call control command. The mobile phone proxy 206 executes with the PBX system 204 the requested call control operation associated with the call control command. For example, the call control command indicates that the mobile phone 108 requests to place the ongoing phone call with the IP phone 208 on hold, the mobile phone proxy 206 receives the call control command, the mobile phone proxy 206 determines that the mobile phone 108 is requesting that the call be placed on hold based at least in part on the call control command, and the mobile phone proxy 206 executes a call operation using the PBX system 204 that places the ongoing call on hold. Thus, in this embodiment 400 of the system, the mobile phone 108 can, among other things, initiate PBX functionality for ongoing phone calls established between the mobile phone 108 and the IP phone 208.

Figure 3D:
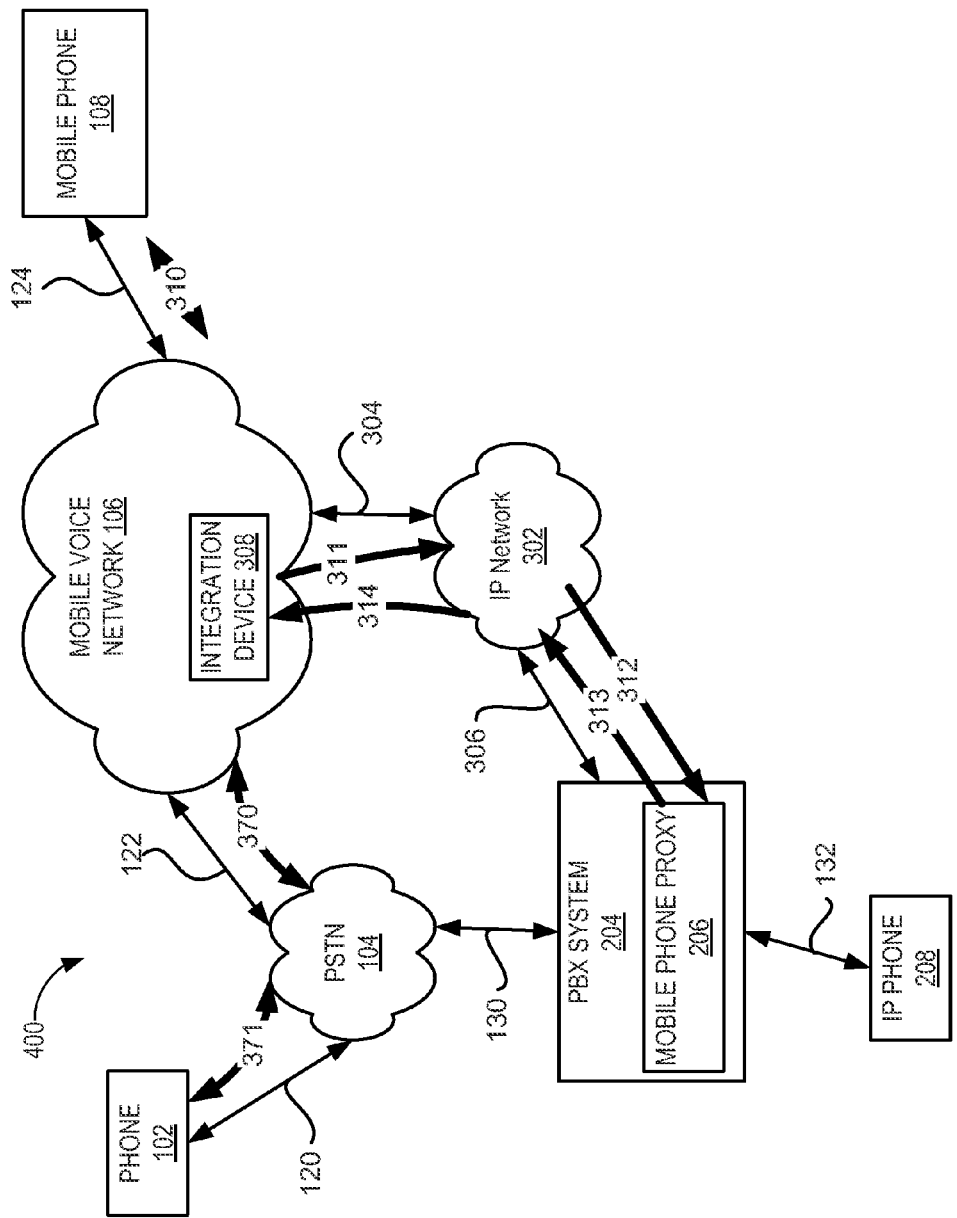

Turning now to FIG. 3D, an embodiment 400 of the system in which a phone call is initiated from the mobile phone 108 to the phone 102 which is communicatively coupled to the PSTN 104 is described. In this embodiment, the voice path for the phone call is established through mobile voice network 106 and the PSTN 104. The PBX system 204 is not in the voice path but remains in the call control path for the duration of the call.

The mobile phone 108 initiates the phone call. The mobile phone 108 sends 310 a phone number for the phone 102 to the integration device 308 via signal line 124.

The integration device 308 receives the dialed number from the mobile phone 108. The integration device 308 sends 311 the dialed number and mobile phone ID to the IP network 302 via the first communication link 304. The IP network 302 sends 312 the dialed number and the mobile phone ID to the mobile phone proxy 206 via the second communication link 306.

The mobile phone proxy 206 receives the dialed number and the mobile phone ID. In one embodiment, the mobile phone proxy 206 determines based on the dialed number and/or the mobile phone ID that the mobile phone 108 is requesting a phone call with the phone 102. In one embodiment, the mobile phone proxy 206 receives the dialed number and mobile phone ID, and then performs one or more of the following functions before responding to the integration device 308: (1) permissions checking to determine the level of access that has or should be granted to the mobile phone 108; (2) determining whether an account code needs to be provided by the mobile phone 108; and (3) least cost routing calculations to determine the best way to route a phone call between the mobile phone 108 and the phone 102. The mobile phone proxy 206 sends 313 the dialed number (PSTN number) and the mobile phone ID to the IP network 302 via the second communication link 306. The mobile phone proxy 206 also sends 312 to the IP network 302, via the second communication link 306, an instruction for the integration device 308 to call the PSTN number for the phone 102.

The IP network 302 receives the PSTN or dialed number, mobile phone ID and the instruction for the integration device 308. The IP network 302 sends 314 the PSTN number, mobile phone ID and the instruction to the integration device 308 via the first communication link 304.

The integration device 308 receives the PSTN number, mobile phone ID and the instruction from the IP network 302. In one embodiment, the integration device 308 determines from the instruction that the mobile phone 108 is requesting a phone call with the phone 102. The integration device 308 causes the mobile voice network 106 to call 370 the phone 102 via the PSTN 104. Specifically, the integration device 308 sends 370 a call for the phone 102 to the PSTN 104. The PSTN 104 receives the call for the phone 102. The PSTN 104 calls 371 the phone 102 and connects a phone call between the mobile phone 108 and the phone 102.

Figure 3E:
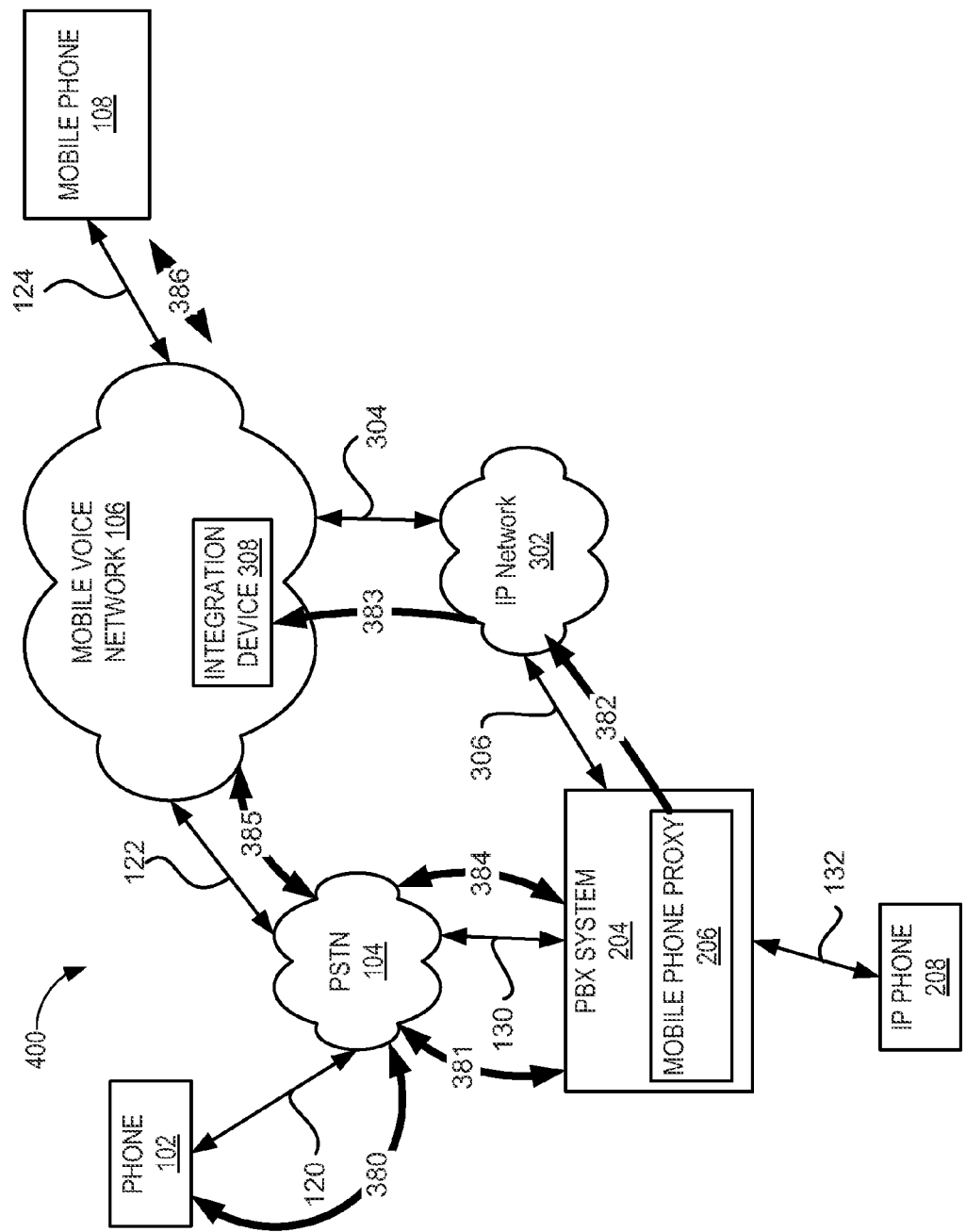

Turning now to FIG. 3E, an embodiment 400 of the system in which a phone call is initiated from the phone 102 to the mobile phone 108 is described.

The phone 102 initiates the phone call. In this case, the person dialing phone 102 is calling the business phone number of a PBX system user, but this user is not using an IP phone (e.g., IP Phone 208) on the PBX system 204, but rather a mobile phone 108. The phone 102 sends 380 a dialed-phone number to the PSTN 104 and the PSTN calls 381 the dialed number which sends an incoming call to the PBX system 204, in particular the mobile phone proxy 206.

The mobile phone proxy 206 sends 382, 383 a notification of an incoming call to the integration device 308 via signal line 306, the IP network 302 and signal line 304.

Next, the mobile phone proxy 206 creates a new call 384, 385 to the mobile voice network 106 via signal line 130, the PSTN 104 and signal line 122. The integration device 308 receives the incoming call, associates it with the prior notification and calls 386 the mobile phone 108. In this embodiment, the present invention advantageously allows a PBX user to receive calls at their mobile phone 108 while having access to PBX functionality or to receive calls at their IP phone 208. Since the user may select to have their calls either at the IP phone 208 coupled to the PBX system 204 or a mobile phone, the present invention accomplishes this by forwarding calls on a call by call basis to either the IP phone 208 or the mobile phone 108 which neither the PSTN 104 nor the normal mobile voice network 106 (in FIG. 1A) allows conventional PBXs to do.

Figure 3F:
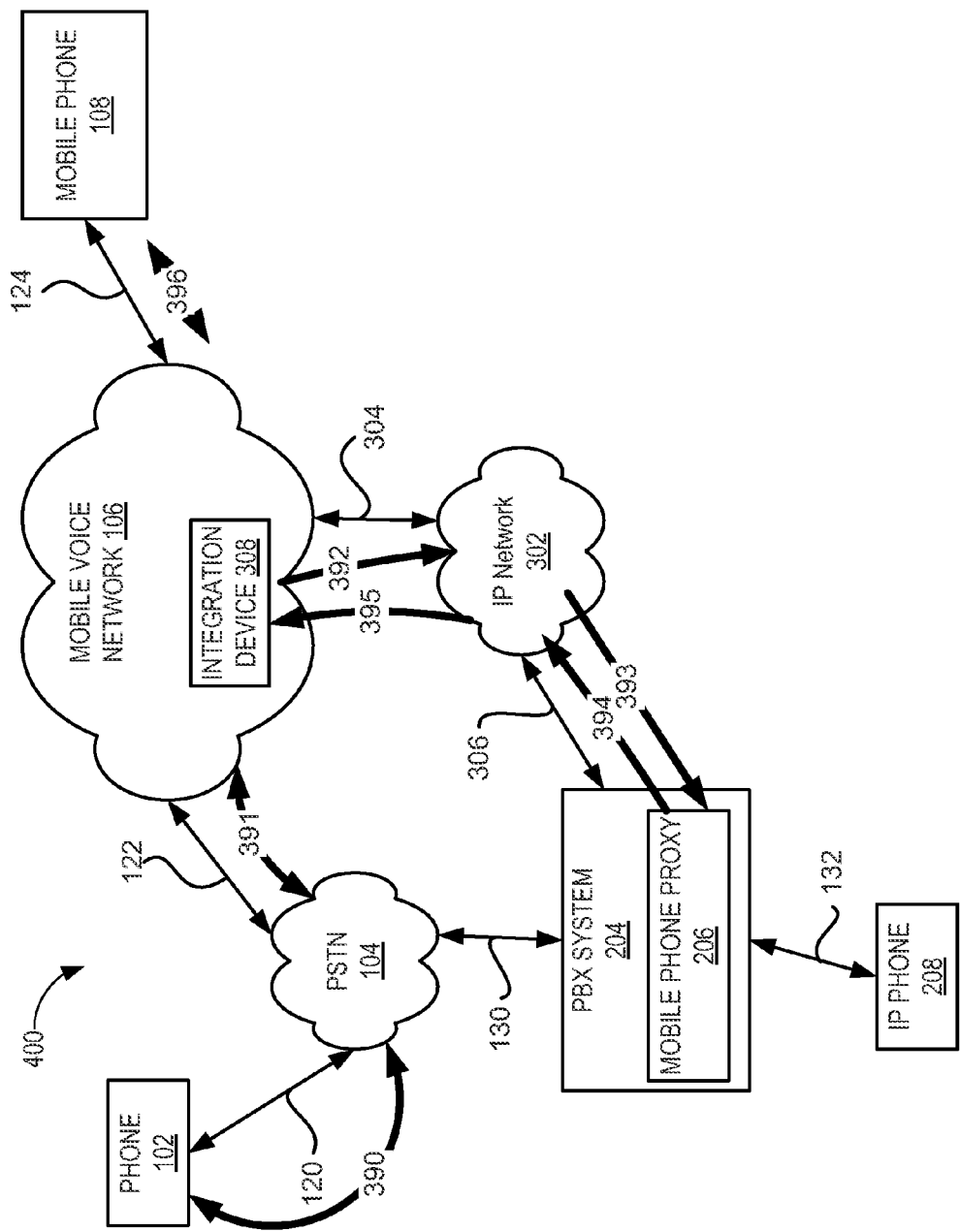

Turning now to FIG. 3F, an embodiment 400 of the system in which a phone call is initiated from the phone 102 to the mobile phone 108 is described. While the voice path is established through the mobile voice network 106 and the PSTN 104 as in FIG. 3E, the PBX system 204 is not in the voice path but remains in the call control path for the duration of the call via the IP network 302.

The phone 102 initiates the phone call. The phone 102 sends 390 a dialed-phone number to the PSTN 104 and the PSTN calls the dialed number which sends 391 the dialed number to the integration device 308. The integration device 308 sends 392, 393 a message to the mobile phone proxy 206, via signal line 304, the IP network 302 and signal line 306, to indicate that the phone 102 is calling the mobile phone 108. The mobile phone proxy 206 determines whether to connect the call to the mobile phone 108, and if so, the mobile phone proxy 206 sends 394, 395 a message to the integration device 308, via signal line 306, the IP network 302 and signal line 304, to connect 396 the call between the phone 102 and the mobile phone 108.

A particular advantage of the present invention in all the scenarios described above with reference to FIGS. 3A-3F is that the user of the mobile phone 108 is able to perform any of the call control functions listed above on calls. Such a capability heretofore was not possible with any prior art systems which makes the present invention patentably distinct over the prior art.

Those skilled in the art will also recognize that in other configurations and call control scenarios in addition to those specific examples shown and described above with reference to FIGS. 3A-3F are possible. For example, a user of PSTN phone 102 calls mobile phone 108 using mobile phone's mobile number, because the user of mobile phone 108 has given out the mobile number as the user's business phone number. The integration device 308 is configured to detect calls to the number of the mobile phone 108. Upon detecting a call to the mobile phone 108, the mobile phone proxy 206 is notified by the integration device 308 and call control is routed through the PBX system 204. Similar to the above examples, now the mobile phone 108 can perform call control function, like forward to voicemail or conference.

Methods

Figure 4:
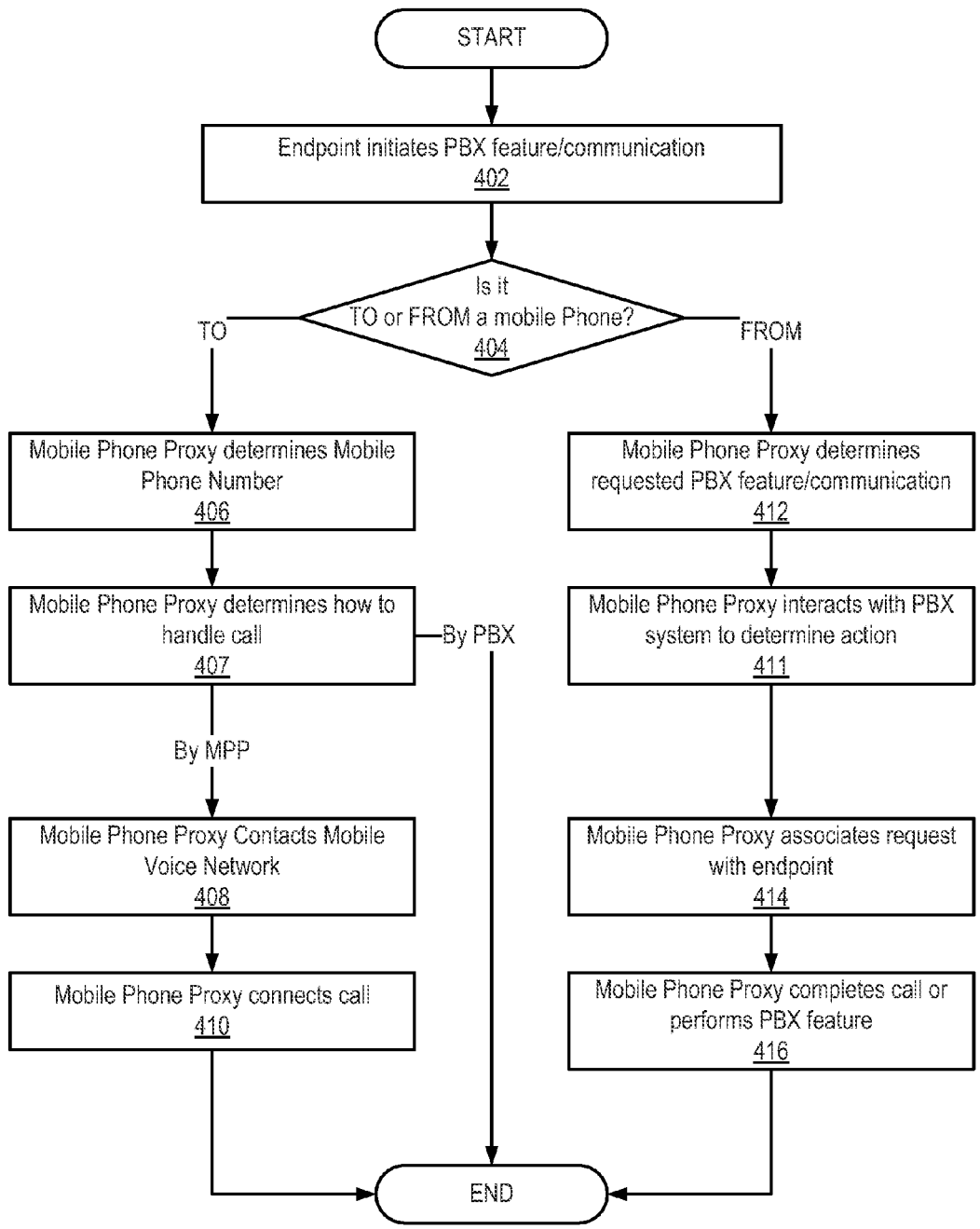
FIG. 4 is a flow chart illustrating a general method of providing PBX functionality for mobile phones according to one embodiment of the present invention.

Referring now to FIG. 4, depicted is a general method of providing PBX functionality for mobile phones according to one embodiment of the present invention. An endpoint initiates 402 a PBX feature or request for communication. An endpoint is either a mobile phone 108 or an IP phone 208. The request is sent to the mobile phone proxy 206. The mobile phone proxy 206 determines 404 if (1) the request is for a call from the IP phone 208 (or phone 102) to the mobile phone 108 or (2) the request is for a call or PBX feature from the mobile phone 108 to the IP phone 208 (or phone 102).

If a call is 404 from the IP phone 208 to the mobile phone 108, the mobile phone proxy 206 determines 406 the mobile phone's 108 mobile phone number. Next, the mobile phone proxy 206 determines how the call should be handled. Depending on the PBX user's settings, the call could be: 1) sent to the mobile phone, 2) handled by the PBX system 204, e.g., forwarded to voicemail, 3) notification sent to the mobile phone 108 and depending on the response the PBX system 204 will take control of the call. For calls to the cell phone that are ring no answer, or like Do Not Disturb, that status needs to be sent back to the PBX system 204 so it can take control of the call. One example of a usage is that all PBX calls to the mobile phone 108 don't end up in the service providers' voice mail mailbox, but instead end up in the user's PBX mailbox. If in step 407 it is determined that the call should be handled by the PBX system 204, including after a notification is sent to the mobile phone 108, this method is complete and ends, and the processing by the PBX system 204 is similar to that described below with reference to FIG. 6. However, if the call should be sent to the mobile phone 108 by the mobile phone proxy 206, the method continues in step 408. The mobile phone proxy 206 contacts 408 the mobile voice network 106. The mobile phone proxy 206 connects 410 a call between the IP phone 208 and the mobile phone 108.

If the request is 404 from the mobile phone 108 to the IP phone 208, the mobile phone proxy 207 determines 412 whether the mobile phone 108 is requesting a PBX feature for an existing phone call or requesting a new phone call communication. The PBX system 204 needs to have control over the call before the number is connected. The mobile phone proxy 206 interacts 411 with PBX system 204 to determine the action to be taken on the call. For example, depending on the call recipient's settings, the call may go to another phone, simultaneous ringing of a number of phones or Do Not Disturb and the call should go to voice mail. Essentially, the mobile phone proxy 206 cooperates 411 with the PBX system 204 to decide where the call goes or is connected. The mobile phone proxy 206 associates 414 the request with the endpoints. The mobile phone proxy 206 either 416 completes the requested phone call or performs the requested PBX function.

Figure 5A:
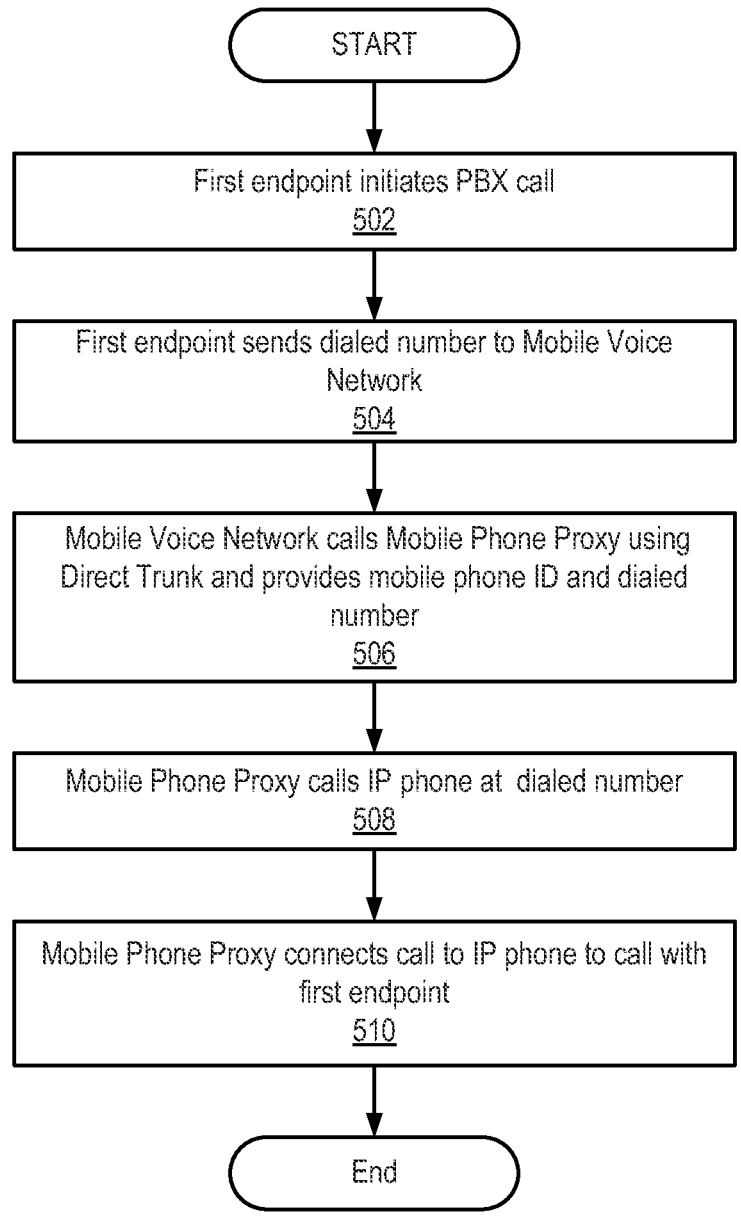
FIGS. 5A-5C are flow charts illustrating methods for using the system of FIGS. 2A-2C to place calls, receive calls and perform PBX operations from a mobile phone according to one embodiment of the present invention.

FIG. 5A depicts a method according to embodiment 202 for using the mobile phone 108 to place a PBX call to the IP phone 208. The first endpoint, the mobile phone 108, initiates 502 a PBX call. The mobile phone 108 sends 504 the dialed number to the mobile voice network 106. The mobile voice network 106 calls 506 the mobile phone proxy 206 using the direct trunk 232 and provides the mobile phone ID and the dialed number to the mobile phone proxy 206. The mobile phone proxy 206 calls 508 the IP phone 208 using the dialed number. The mobile phone proxy 206 connects 510 the direct trunk call, which is connected to the mobile phone 108, to the IP phone 208 call.

Figure 5B:
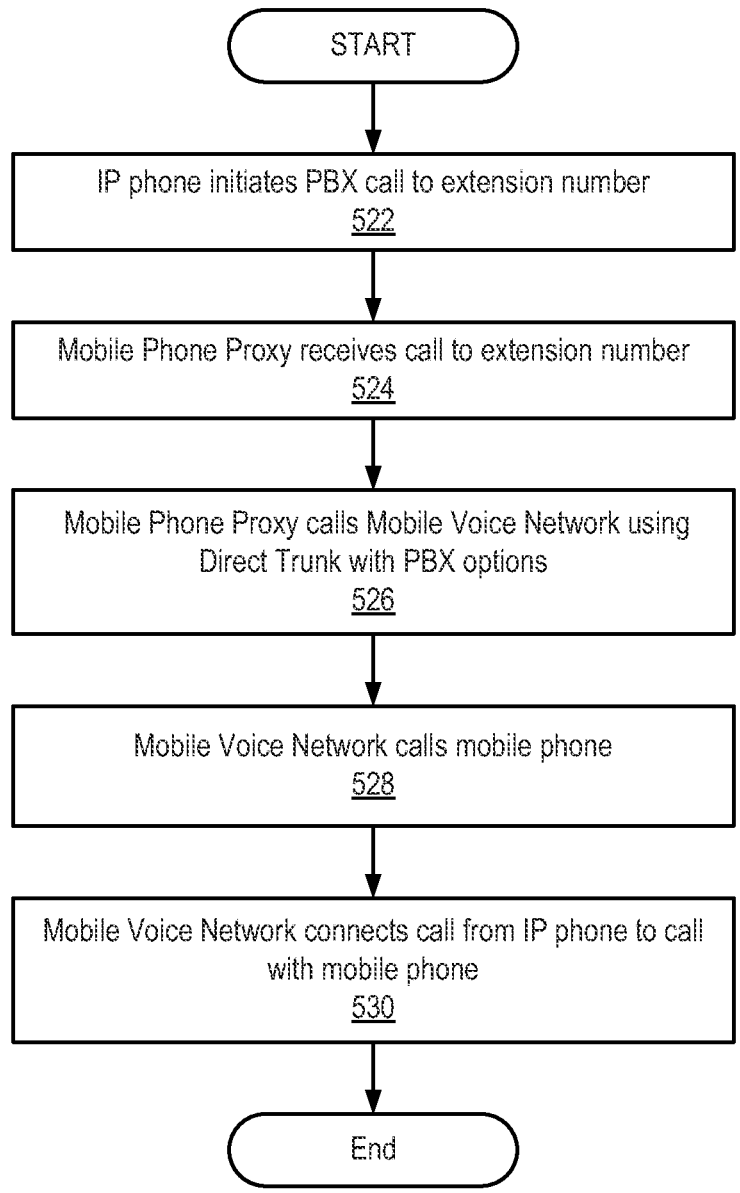

FIG. 5B depicts a method according to embodiment 202 for using the IP phone 208 to place a call to the mobile phone 108. The IP phone 208 initiates 522 a call to the PBX extension number associated with the mobile phone 108. The mobile phone proxy 206 receives 524 the call to the mobile phone's PBX extension number. Using PBX features, the mobile phone proxy 206 calls 526 the mobile voice network 106 using the direct trunk 232. The call by the mobile phone proxy 206 to the mobile voice network 106 includes PBX options. For example, the PBX options may include additional call handling instructions such as "do not forward," or "auto-answer" for the intercom function. The mobile voice network 106 calls 528 the mobile phone 108 and enforces any of the PBX options. The mobile voice network 106 connects 530 the call from the IP phone 208 to the call with the mobile phone 530.

Figure 5C:
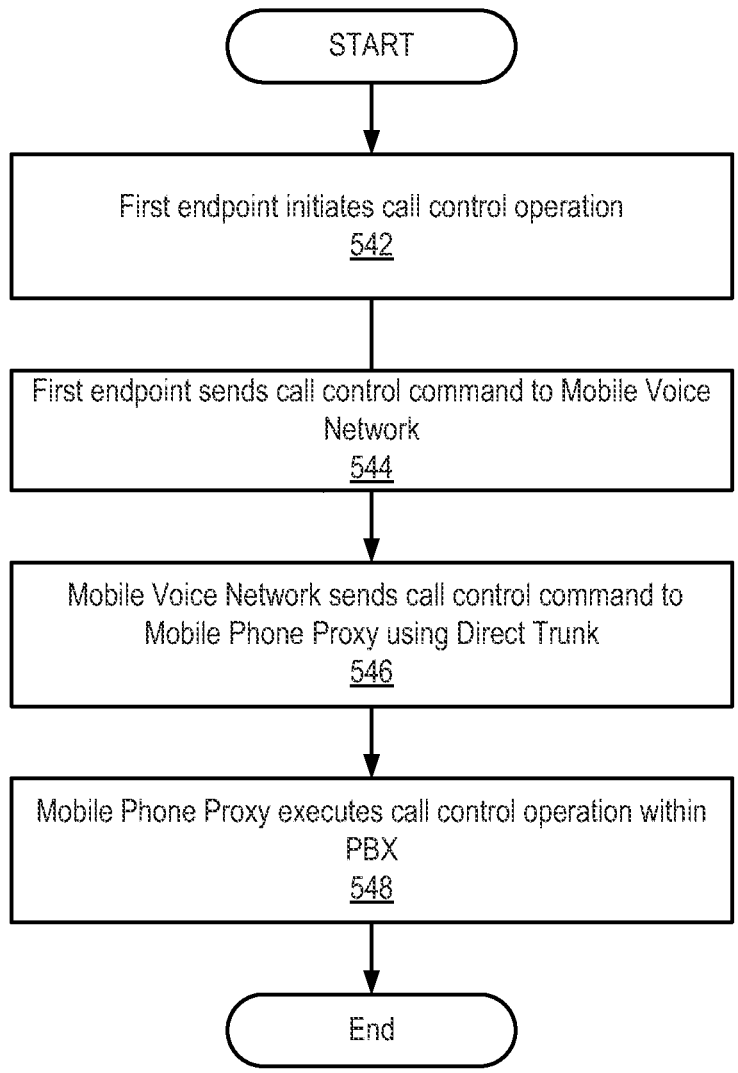

FIG. 5C depicts a method according to embodiment 202 for using the mobile phone 108 to perform PBX functions on an established call between the mobile phone 108 and the IP phone 208. The mobile phone 108 initiates 542 a call control operation, for example, three-way calling. The mobile phone 108 sends 544 the call control command to the mobile voice network 106. The mobile voice network 106 sends 546 the call control command to the mobile phone proxy 206 using the direct trunk 232. The mobile phone proxy 206 executes 548 the call control operation with the PBX system 204 to perform the requested PBX function on the existing call.

Figure 6A:
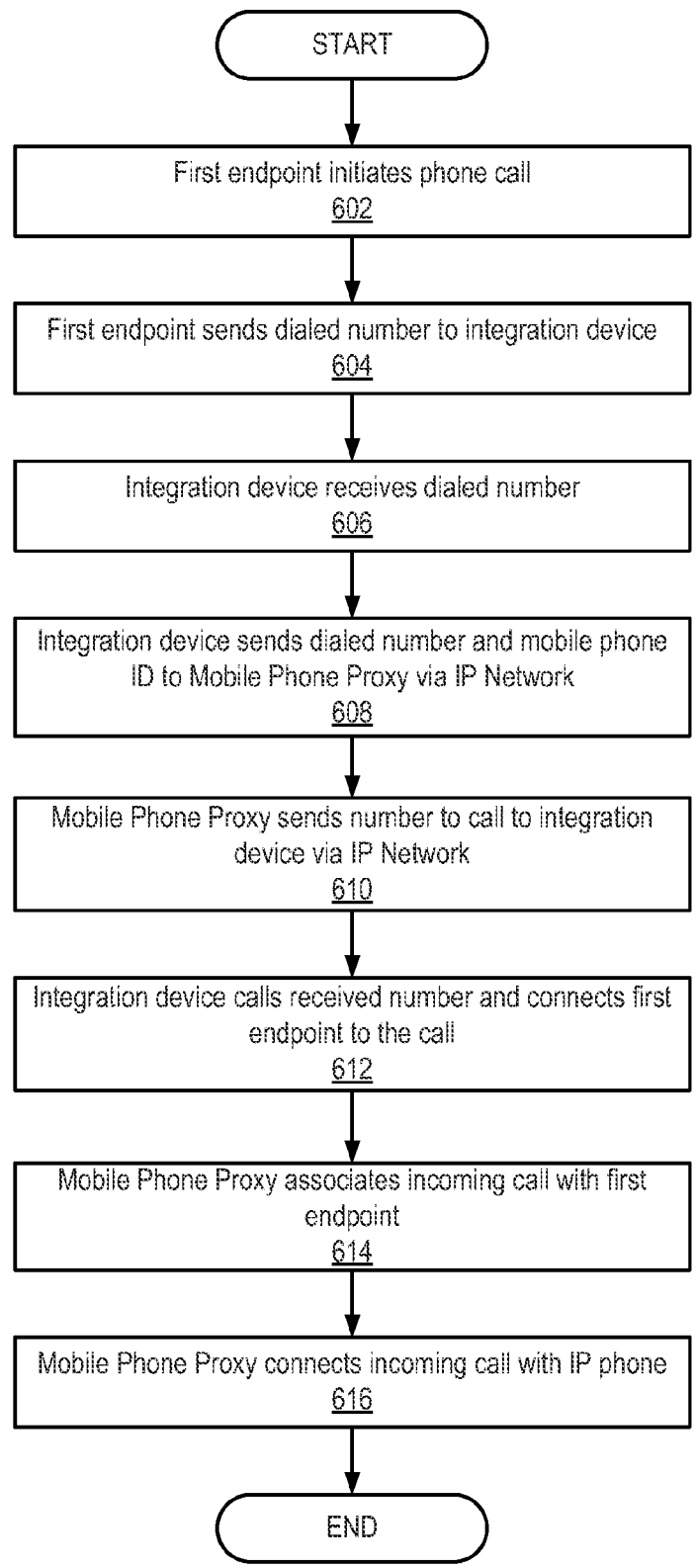
FIGS. 6A-6C are flow charts illustrating methods for using the system of FIGS. 3A-3C to place calls, receive calls and perform PBX operations from a mobile phone according to one embodiment of the present invention.

FIG. 6A depicts a method according to embodiment 400 for using the mobile phone 108 to place a PBX call to the IP phone 208. The first end point, mobile phone 108, initiates 602 a phone call to the IP phone 208. The mobile phone 108 sends 604 the dialed number to the integration device 308. The integration device 308 receives 606 the dialed number. The integration device 308 sends 608 the dialed number and the mobile phone ID to the mobile phone proxy 206 via the IP network 302. The mobile phone proxy 206 sends 610 a number to call to integration device 308. The integration device 308 calls 612 the received number and connects the mobile phone 108 to the call. The mobile phone proxy 206 associates 614 the incoming call with the mobile phone 108. The mobile phone proxy 206 connects 616 the incoming call with the IP phone 208.

Figure 6B:
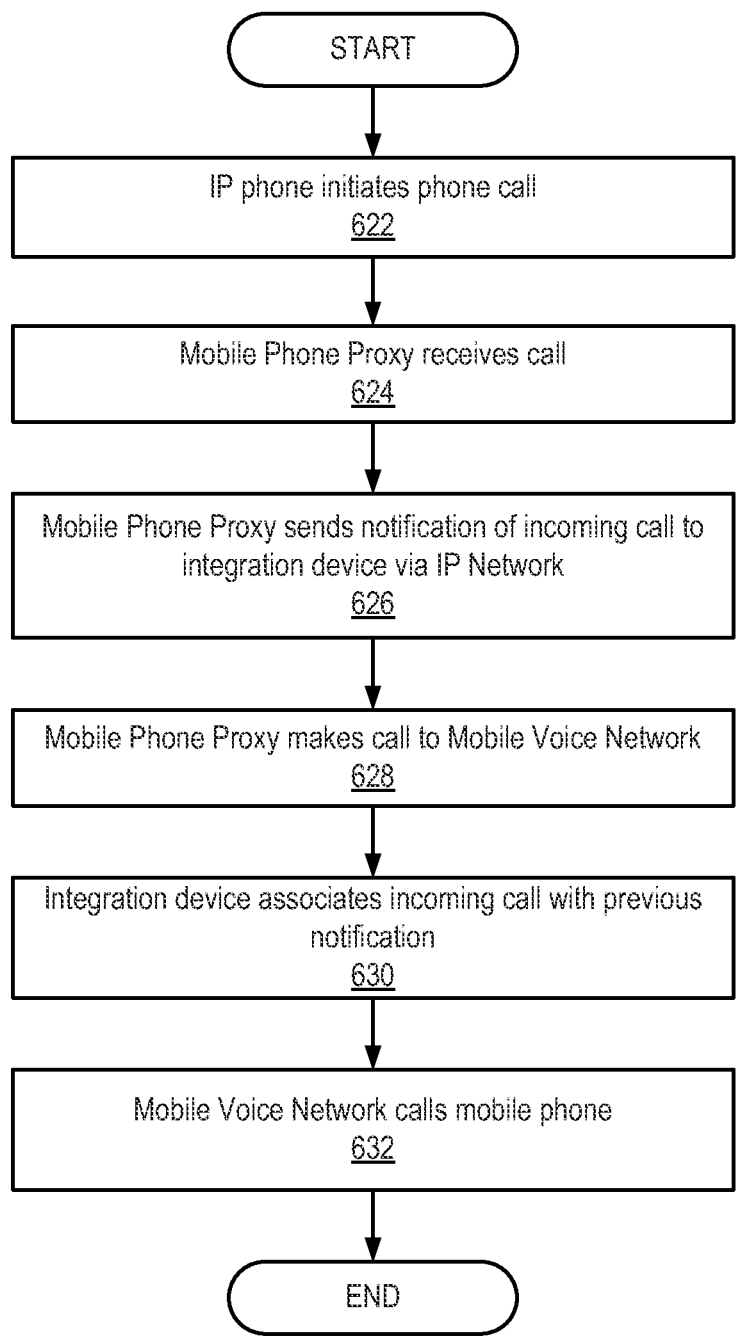

FIG. 6B depicts a method according to embodiment 400 for using the IP phone 208 to place a PBX call to the mobile phone 108. The IP phone 208 initiates 622 a phone call to the mobile phone 108. The mobile phone proxy 204 receives 624 the call. The mobile phone proxy 206 sends 626 a notification of the incoming call to the integration device 308 via the IP network 302. The mobile phone proxy 206 places a call 628 to the mobile voice network 106. The integration device 308 associates 630 the incoming call with the previously received notification. The integration device 308 causes the mobile voice network 106 to call 632 the mobile phone 106 and connects it with the incoming call.

Figure 6C:
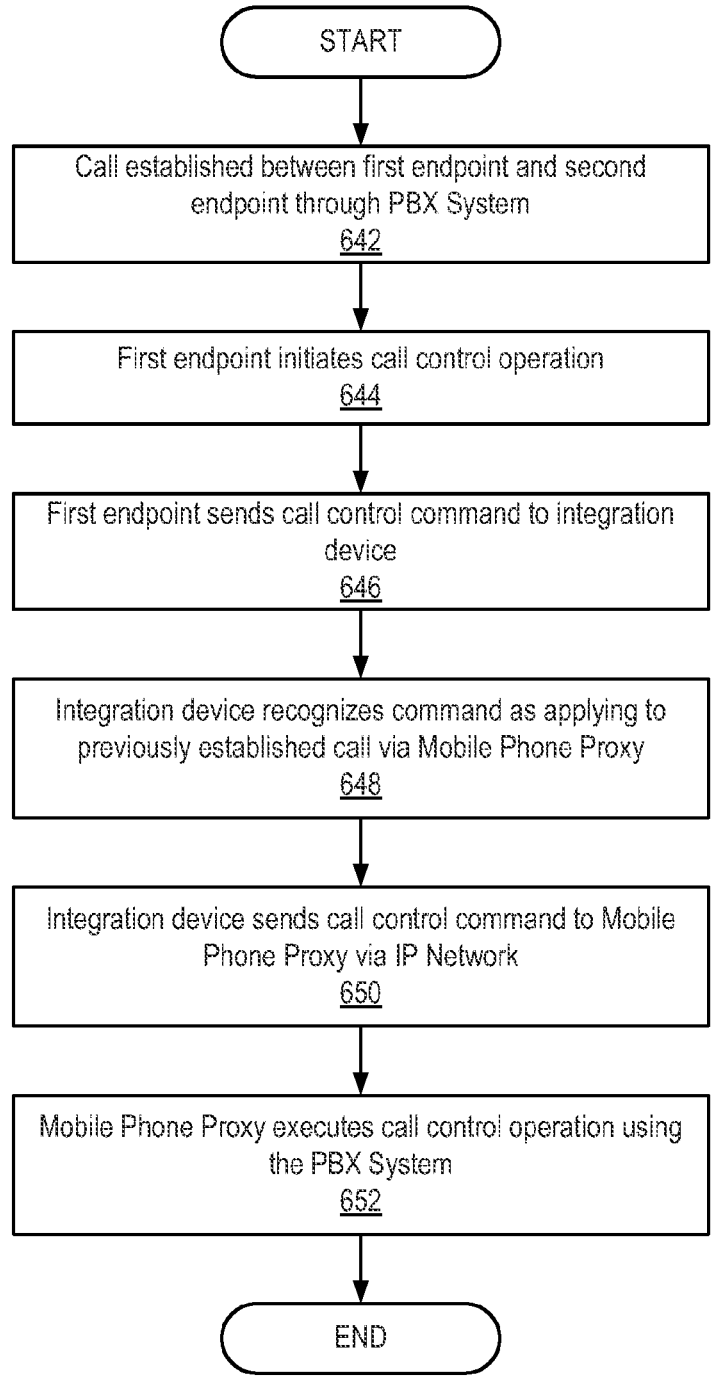

FIG. 6C depicts a method according to embodiment 400 for using the mobile phone 108 to perform PBX functions on an established PBX call between the mobile phone 108 and the IP phone 208. A call is established 642 between the mobile phone 108 and the IP phone 208 through the PBX system 204. The first endpoint, the mobile phone 108, initiates 644 a call control operation. The mobile phone 108 sends 646 the call control command to the integration device 308. The integration device 308 recognizes 648 the command as applying to the previously established call between the mobile phone 108 and the IP phone 208 via the mobile phone proxy 206. The integration device 308 sends 650 the call control command to the mobile phone proxy 206 via the IP network 302. The mobile phone proxy 206 executes 652 the call control operation with the PBX system 204.

In one embodiment, the mobile phone proxy 206 sends one or more display messages along the call control path 210 to the mobile phone 108. The display messages include data for causing the mobile phone 108 to display text or graphics on the mobile phone's graphical user interface. The mobile phone 108 receives the display messages and causes the indicated text or graphics to be displayed on the graphical user interface of the mobile phone 108. A user of the mobile phone 108 uses the text or graphics to initiate PBX functionality using the mobile phone 108. In one embodiment, these user interface interactions occur whether there is an active call or not. For example, when on an active call, the mobile phone 108 has a set of actions that can be performed on the active call by selecting a menu option on the graphical user interface of the mobile phone 108. The mobile phone proxy 206 sends a display message that inserts additional menu options that are not natively supplied by the mobile phone 108. In one embodiment, these additional options are PBX features. In another embodiment, the PBX features are only displayed if the user of the mobile phone 108 has the required PBX permissions to invoke these PBX features. A message is sent to the mobile phone proxy 206 via the mobile voice network 106 responsive to the user of the mobile phone 108 invoking a PBX feature. The message indicates to the mobile phone proxy 206 the particular PBX feature requested by the mobile phone 108. This message causes the mobile phone proxy 206 to take steps to provide the requested PBX feature.

In another embodiment, the mobile phone proxy 206 causes additional messages to be displayed on the mobile phone 108. For example, the mobile phone proxy 206 uses one or more display messages as described above to cause the mobile phone to display the "presence" of a PBX user on a call connection after dialing and placing a call to a PBX device such as the IP phone 208. The "presence" indicates whether or not the user of the IP phone 208 is present and/or available on the IP phone 208. For example, the graphical user interface of the mobile phone 108 indicates that a user of the IP phone 208 is available for conversation on a connected phone call by indicating text-based status messages statuses such as "Do Not Disturb", "Busy", "After hours", "Mobile Off", "Phone off network", etc. on the mobile phone's 108 graphical user interface. In one embodiment, instead of indicating the presence as a text-based message, the mobile phone proxy 206 sends display messages that cause the mobile phone 108 to display the call statuses as icons on the mobile phone's 108 graphical user interface.

In still another embodiment, the mobile phone proxy 206 uses one or more display messages to cause the mobile phone to display a call progress for a call connection. A call progress is a message displayed on the mobile phone's 108 graphical user interface indicating the connection status of the phone call. For example, the call progress displays a text-based message such as "connected" on the mobile phone's 108 graphical user interface if the user of the mobile phone 108 is connected on a phone call. The call progress can also include call duration information. In one embodiment the status message is indicated as an icon. In a similar fashion, the mobile phone proxy can feed the IP phone 208 with display messages to indicate the presence of the user of the mobile phone 108.

In one embodiment, the mobile phone proxy 206 continuously feeds display messages to the mobile phone 108 and/or the IP phone 208 to indicate the presence of the other device. In another embodiment these display messages are sent at regular or irregular intervals.

In one embodiment, the calls placed by the mobile phone 108 and the IP phone 208 are seen by the mobile phone proxy 206, and the call history for the mobile phone 108 and the IP phone 208 are available via the mobile phone proxy 206. For example, the mobile phone proxy 206 causes a menu item to be displayed on the mobile phone 108, the user of the mobile phone 108 selects this menu item and the mobile phone proxy 206 causes the mobile phone 108 to display the call history of the IP phone 208. Thus, a user of the mobile phone 108 can view the call history of the mobile phone 108 and the IP phone 208. In one embodiment, the mobile phone 108 can only display the call history of the IP phone 208 if the mobile phone 108 has permission to view the call history.

Figure 6D:
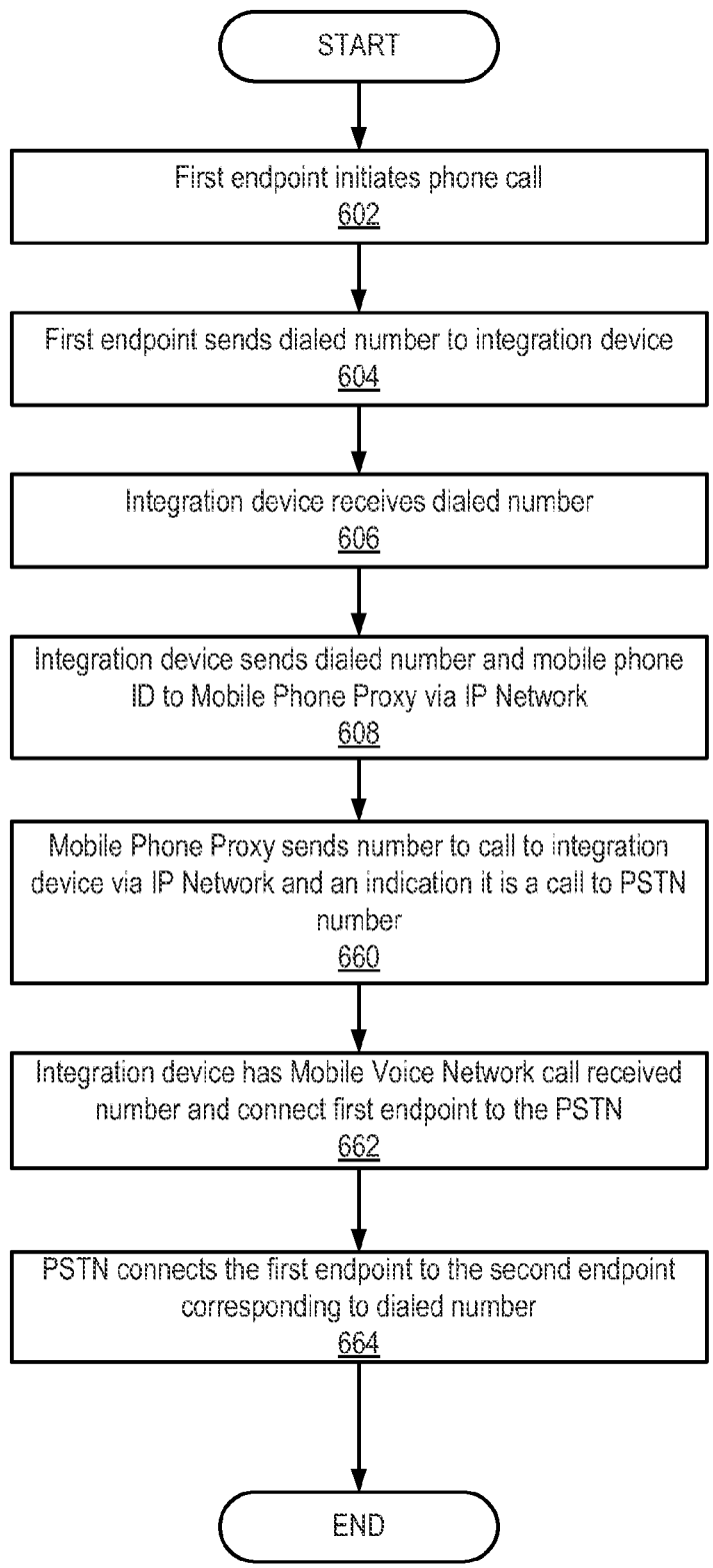
FIG. 6D is a flow chart illustrating a method for using the system of FIG. 3D to place a call from a mobile phone using the PSTN according to one embodiment of the present invention.

FIG. 6D depicts a method according to embodiment 400 for using the mobile phone 108 to initiate a phone call from the mobile phone 108 to the phone 102. The voice path is established through the mobile voice network 106 and the PSTN 104. The PBX system 204 is not in the voice path but remains in the call control path for the duration of the call via the IP network 302. The mobile phone 108 initiates 602 a phone call to the phone 102. The mobile phone 108 sends 604 the dialed number to the integration device 308. The integration device 308 receives 606 the dialed number. The integration device 308 sends 608 the dialed number and the mobile phone ID to the mobile phone proxy 206 via the IP network 302. The mobile phone proxy 206 sends 660 to the integration device 308, via the IP network 302, a number for the integration device 308 to call and an indication that the call is to be placed to a PSTN number. The integration device 308 causes the mobile voice network 106 to call 662 the PSTN number and connects the mobile phone 108 to the call. The PSTN 104 connects 664 a phone call between the mobile phone 108 and the phone 102.

Figure 6E:
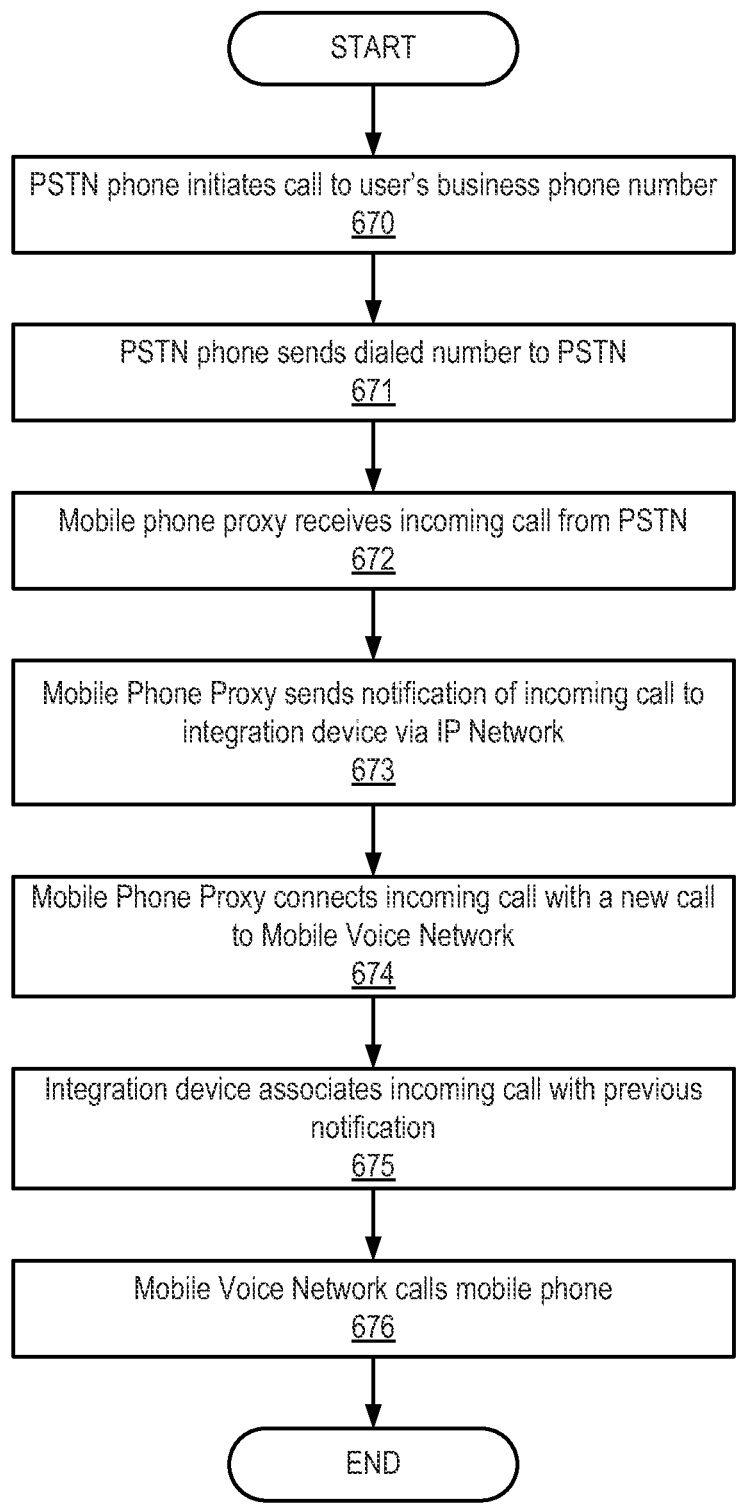
FIG. 6E is a flow chart illustrating a method for using the system of FIG. 3E to place a call from a PSTN phone to a mobile phone according to one embodiment of the present invention.

FIG. 6E depicts a method according to embodiment 400 for using the PSTN phone 102 to initiate a phone call from the phone 102 to the mobile phone 108. The voice path is established through the mobile voice network 106, the PSTN 104 and the PBX system 204. The phone 102 initiates 670 a phone call to a user's direct-dial business phone number (i.e. not the user's mobile phone number). The phone 102 sends 671 the dialed number to the PSTN 104. The mobile phone proxy 206 receives the incoming call 672 from the PSTN 104. The mobile phone proxy 206 sends 673 a notification of the incoming call to the integration device 308 via the IP network 302. The mobile phone proxy 206 connects 674 the incoming call to a new call to the mobile voice network 106 via the PSTN 104. The integration device 308 associates 675 the incoming call with the previously received notification. The integration device 676 causes the mobile voice network 106 to call 632 the mobile phone 106 and connects it with the incoming call.

Figure 6F:
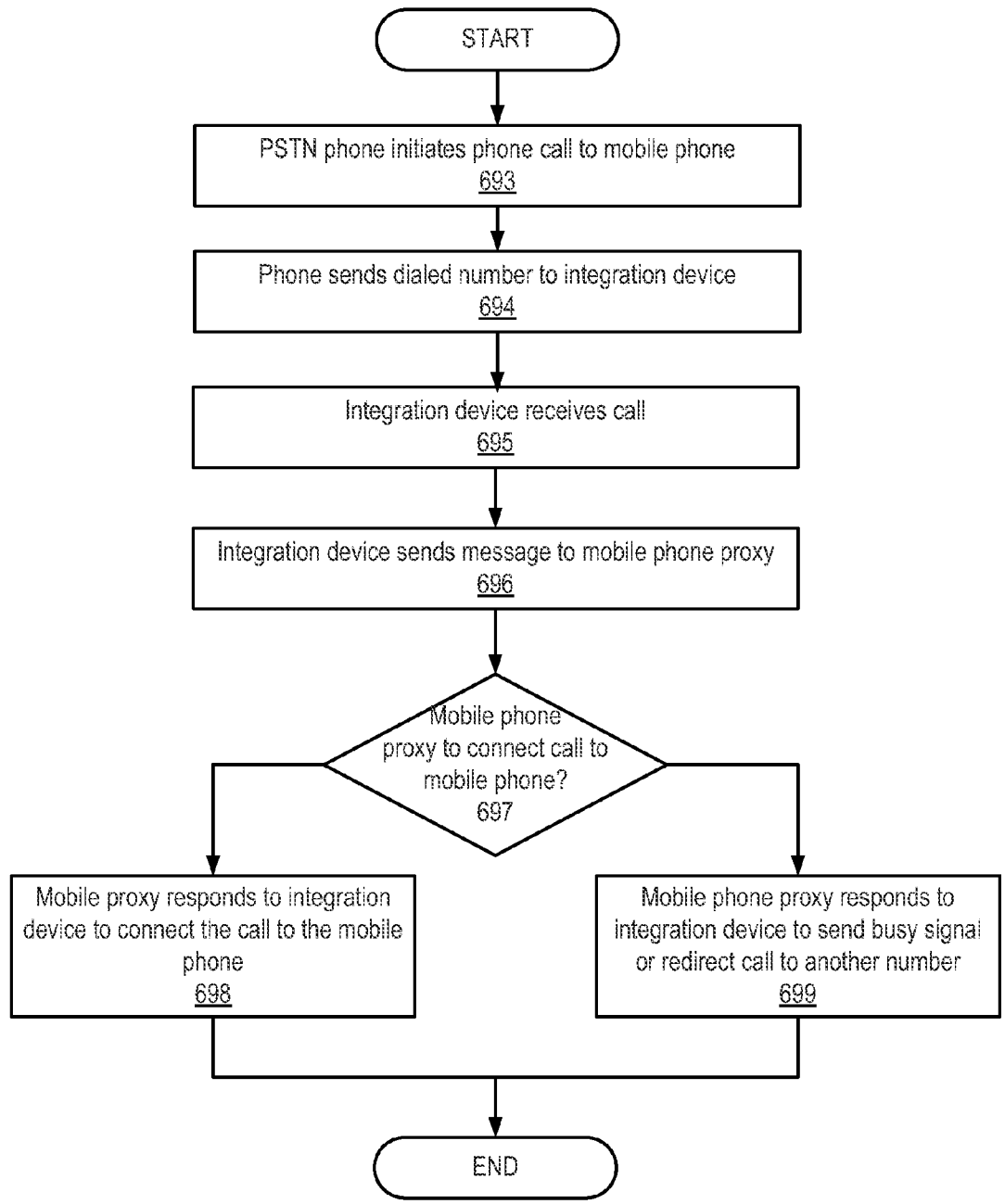
FIG. 6F is a flow chart illustrating a method for using the system of FIG. 3F to place a call from a PSTN phone to a mobile phone according to second embodiment of the present invention.

FIG. 6F depicts another method according to embodiment 400 for using the PSTN phone 102 to initiate a phone call from the phone 102 to the mobile phone 108. The voice path is established through the mobile voice network 106 and the PSTN 104. The PBX system 204 is not in the voice path but remains in the call control path for the duration of the call via the IP network 302. The phone 102 initiates 693 a phone call to the mobile phone 108. The phone 102 sends 694 the dialed number to the PSTN 104 and the PSTN sends the dialed number to the integration device 308. The dialed number is the mobile phone number associated with the mobile phone 108. The integration device 308 receives 695 the dialed number. The integration device 308 sends 696 a message to the mobile phone proxy 206 to indicate that the phone 102 is calling the mobile phone 108. The mobile phone proxy 206 receives the message and determines 697 whether to connect the call to the mobile phone 108. This determination is made depending on the setting of the user such as "do not disturb." If the mobile phone proxy 206 determines the call should be connected, the mobile phone proxy 206 then sends a message to the integration device 308 to connect 698 the call between the phone 102 and the mobile phone 108. If the mobile phone proxy 206 determines the call should not be connected, the mobile phone proxy 206 sends a message to the integration device 308 that a busy signal should be returned on the call or that the call should be redirected (e.g., to voicemail).

Figure 7:
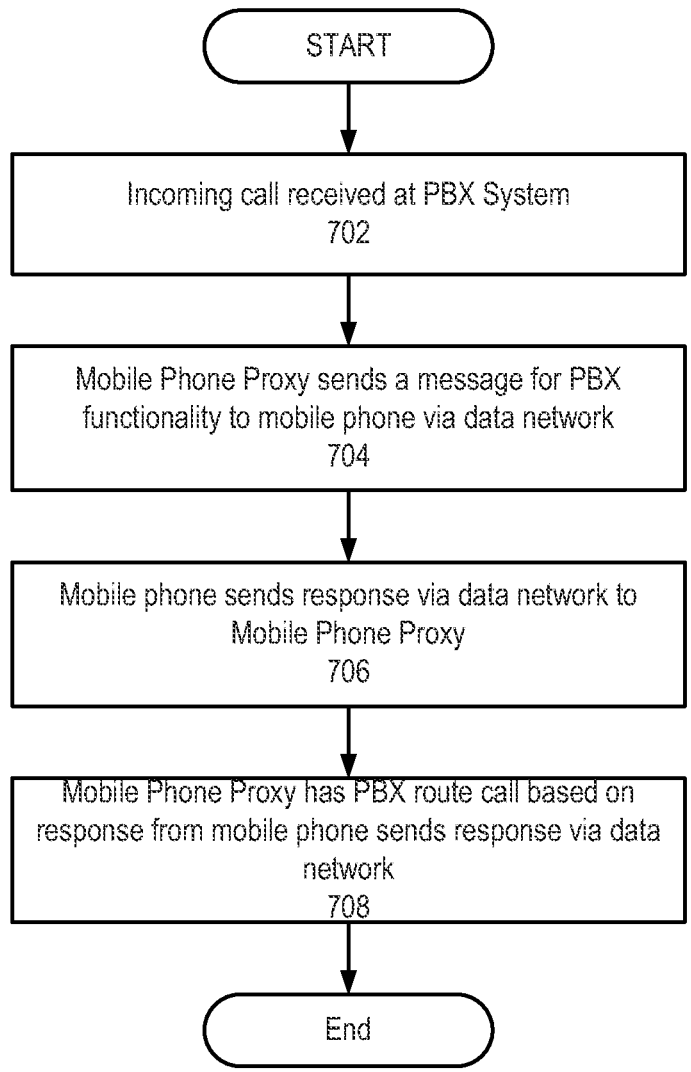
FIG. 7 is a flow chart illustrating a general method of providing PBX functionality for mobile phones according to one embodiment of the present invention.

FIG. 7 depicts a general method according to embodiment 202 for using the mobile phone 108 to perform PBX functions on an established PBX call between the mobile phone 108 and the IP phone 208. An incoming call is received 702 at the PBX system 204. The mobile phone proxy 206 sends 704 a message for PBX functionality to the mobile phone 108 via the IP network 302 or via a data path through the mobile network such as SMS. The mobile phone 108 receives the message from the mobile phone proxy 206. The mobile phone 108 sends 706 a response via the IP network 302 to the mobile phone proxy 206. The mobile phone proxy 206 causes 708 the PBX system 204 to route the established call based on the response received from the mobile phone 108.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

What is claimed is:

1. A method for providing PBX functionality for mobile phones, the method comprising:
   intiating, by a mobile phone, a phone call to an IP phone, the mobile phone associated with a mobile phone ID and the IP phone associated with an extension number;
   sending, by the mobile phone, the extension number to an integration device;
   sending, by the integration device, the extension number and the mobile phone ID to a mobile phone proxy, the integration device for allowing the mobile phone to use PBX functionality;
   translating, by the mobile phone proxy, the extension number into a PSTN number and determining, by the mobile phone proxy the IP phone that is being called;
   sending, by the mobile phone proxy, a connection number to an IP network, the connection number for the integration device to utilize to connect the phone call between the mobile phone and the IP phone;
   sending, by the IP network, the connection number to the integration device;
   causing, by the integration device, a mobile voice network to establish the phone call with the mobile phone;
   associating, by the mobile phone proxy, the phone call with the mobile phone and connecting the phone call with the IP phone;
   establishing a call control path between the mobile phone and a private branch exchange, the call control path including the mobile voice network;
   receiving, at the private branch exchange via the call control path, a call control command requesting to perform a PBX function from the mobile phone via the mobile phone proxy; and
   using the call control path between the mobile phone and the private branch exchange to perform the PBX function.

2. The method of claim 1, wherein the call control path includes a direct trunk line, an IP data network, a mobile data network or a 4G network.

3. The method of claim 1, wherein the call control path includes enhanced messaging capabilities.

4. The method of claim 1, wherein the PBX function is one from a group of placing a call to the mobile phone, placing a call from the mobile phone, and other PBX function.

5. The method of claim 1, wherein the private branch exchange includes the mobile phone proxy and the mobile phone proxy is coupled in the call control path.

6. The method of claim 1, wherein an integration device is coupled in the call control path.

7. The method of claim 1, wherein the mobile phone proxy causes the private branch exchange to perform the PBX function.

8. The method of claim 1, comprising sending data for presentation on the mobile phone from the private branch exchange to the mobile phone.

9. The method of claim 8, wherein the data for presentation on the mobile phone includes a menu item, a call history entry, presence information or an icon.

10. The method of claim 8, wherein the private branch exchange includes the mobile phone proxy and the mobile phone proxy sends the data on the call control path to the mobile phone.

11. An apparatus for providing PBX functionality for mobile phones, the apparatus comprising:
    a private branch exchange for performing a PBX function and coupled to a mobile phone, the mobile phone initiating a phone call to an IP phone, the mobile phone associated with a mobile phone ID and the IP phone associated with an extension number;
    an integration device for receiving the extension number and sending the extension number and the mobile phone ID to a mobile phone proxy, the integration device for allowing the mobile phone to use PBX functionality,
    a call control path from the mobile phone, the call control path including a mobile voice network;
    a mobile phone proxy coupled to the mobile phone by the call control path and coupled to the private branch exchange; and
    wherein the private branch exchange receives, via the call control path, a call control command requesting to perform a PBX function from the mobile phone via the mobile phone proxy and uses the call control path between the private branch exchange and the mobile phone to perform the PBX function.

12. The apparatus of claim 11, wherein the call control path includes a direct trunk line, an IP data network, a mobile data network or a 4G network.

13. The apparatus of claim 11, wherein the call control path includes enhanced messaging capabilities.

14. The apparatus of claim 11, wherein the call control path is established by the mobile phone.

15. The apparatus of claim 11, wherein the call control path is established by the private branch exchange.

16. The apparatus of claim 11, wherein the PBX function is one from a group of placing a call to the mobile phone, placing a call from the mobile phone, and other PBX function.

17. The apparatus of claim 11, wherein an integration device is coupled in the call control path and used by the mobile phone proxy for call control.

18. The apparatus of claim 11, wherein the mobile phone proxy performs call control and device identification associated with the PBX function.

19. The apparatus of claim 11, wherein the mobile phone proxy sends data for presentation on the mobile phone on the call control path to the mobile phone.

20. The apparatus of claim 19, wherein the data for presentation on the mobile phone includes a menu item, a call history entry, presence information or an icon.

21. A method for providing PBX functionality for mobile phones, the method comprising:
    initiating, by a mobile phone, a phone call to an IP phone, the mobile phone associated with a mobile phone ID and the IP phone associated with an extension number;
    sending, by the mobile phone, the extension number to an integration device;
    sending, by the integration device, the extension number and the mobile phone ID to a mobile phone proxy, the integration device for allowing the mobile phone to use PBX functionality;
    translating, by the mobile phone proxy, the extension number into a PSTN number and determining, by the mobile phone proxy the IP phone that is being called;
    sending, by the mobile phone proxy, a connection number to an IP network, the connection number for the integration device to utilize to connect the phone call between the mobile phone and the IP phone;
    sending, by the IP network, the connection number to the integration device;
    causing, by the integration device, a mobile voice network to establish the phone call with the mobile phone;

associating, by the mobile phone proxy, the phone call with the mobile phone and connecting the phone call with the IP phone;

establishing a call control path between the mobile phone and a private branch exchange, the call control path including the mobile voice network;

sending, from the private branch exchange, a notification indicating an incoming call to a PBX extension that is monitored by the mobile phone; and using the call control path between the mobile phone and the private branch exchange to send the notification, wherein, responsive to receiving a call control command requesting to perform a PBX function from the mobile phone, the call control path including the mobile voice network carries the call control command to the private branch exchange.

22. The method of claim 21, wherein the step of sending is performed in response to the incoming call to the private branch exchange.

23. The method of claim 21, comprising sending a message from the mobile phone to the private branch exchange.

24. The method of claim 23, wherein the message includes information about a status of the mobile phone.

25. The method of claim 21, wherein the call control path includes a direct trunk line, an IP data network, a mobile data network or a 4G network.

26. The method of claim 21, wherein the private branch exchange includes a mobile phone proxy and the mobile phone proxy is coupled in the call control path to send notifications and receive messages.

27. The method of claim 21, wherein an integration device is coupled in the call control path.

28. The method of claim 21, comprising sending data for presentation on the mobile phone from the private branch exchange to the mobile phone.

29. The method of claim 28, wherein the data for presentation on the mobile phone includes a menu item, a call history entry, presence information or an icon.

30. The method of claim 28, wherein the private branch exchange includes a mobile phone proxy and the mobile phone proxy sends the data on the call control path to the mobile phone.

* * * * *